United States Patent
Davids

(10) Patent No.: US 10,660,300 B2
(45) Date of Patent: May 26, 2020

(54) LITTER SCOOP FOR NON-CLUMPING PELLETED LITTERS

(71) Applicant: GALUKU GROUP LIMITED, Tsim Sha Tsui (HK)

(72) Inventor: Joe Davids, Vaucluse (AU)

(73) Assignee: GALUKU GROUP LIMITED, Tsim Sha Tsui (HK)

( * ) Notice: Subject to any disclaimer, the term of this patent is extended or adjusted under 35 U.S.C. 154(b) by 0 days.

(21) Appl. No.: 16/051,584

(22) Filed: Aug. 1, 2018

(65) Prior Publication Data
US 2019/0159423 A1 May 30, 2019

Related U.S. Application Data

(60) Provisional application No. 62/590,957, filed on Nov. 27, 2017.

(51) Int. Cl.
*A01K 1/01* (2006.01)
*B07B 1/02* (2006.01)
*E01H 1/12* (2006.01)

(52) U.S. Cl.
CPC ............ *A01K 1/0114* (2013.01); *B07B 1/02* (2013.01); *E01H 1/1206* (2013.01); *E01H 2001/1233* (2013.01)

(58) Field of Classification Search
CPC ........... A01K 1/0114; E01H 1/1206; E01H 2001/1233; F24B 15/08; B07B 1/02
USPC ............... 294/1.3, 179, 9, 10; 209/418, 419
See application file for complete search history.

(56) References Cited

U.S. PATENT DOCUMENTS

| | | | | |
|---|---|---|---|---|
| 366,887 A | * | 7/1887 | Scholes | |
| 1,306,931 A | * | 6/1919 | Thomas | F24B 15/08 209/419 |
| 1,357,709 A | * | 11/1920 | Jacobus | F24B 15/08 209/419 |
| 1,409,572 A | * | 3/1922 | Wilbur | F24B 15/08 209/419 |

(Continued)

FOREIGN PATENT DOCUMENTS

| | | |
|---|---|---|
| CN | 2654032 Y | 11/2004 |
| CN | 2744299 Y | 12/2005 |
| GB | 5929 * | 6/1905 |

OTHER PUBLICATIONS

International Search Report and Written Opinion dated Jan. 4, 2019 for International Application No. PCT/IB2018/055786.

*Primary Examiner* — Dean J Kramer
(74) *Attorney, Agent, or Firm* — Miles & Stockbridge, P.C.

(57) ABSTRACT

A litter scoop for pelleted pet litters is provided. Embodiments include a scoop having a sieved top scoop portion, a solid bottom scoop portion, and a hollow tubular handle in fluid communication with the bottom scoop portion. The bottom scoop portion includes a floor having a back edge proximal to the back end of the scoop and in fluid communication with the handle, and a wall extending upward from the floor's side edges and leading edge. The top scoop portion has openings sized such that unused litter pellets cannot pass through the openings and used litter passes through the openings. The wall of the bottom scoop portion is shaped such that a leading edge and side edges of the top scoop portion are engageable with an upper edge of the wall such that the bottom scoop portion and the top scoop portion are spaced from each other.

19 Claims, 21 Drawing Sheets

(56) References Cited

U.S. PATENT DOCUMENTS

| | | | | |
|---|---|---|---|---|
| 1,554,525 A | * | 9/1925 | Ricci | F24B 15/08 209/419 |
| 2,005,416 A | * | 6/1935 | Fisher | F24B 15/08 209/418 |
| 3,354,575 A | * | 11/1967 | Darrow | A01K 97/05 43/56 |
| 3,428,353 A | * | 2/1969 | St. Jean | A01M 3/00 294/15 |
| D255,951 S | * | 7/1980 | Halls | 294/1.3 |
| 4,305,376 A | * | 12/1981 | Neugent | F23J 1/04 126/242 |
| D360,714 S | | 7/1995 | d'Alquen | |
| 5,460,293 A | | 10/1995 | Erickson | |
| 5,580,111 A | | 12/1996 | Bohn | |
| D387,514 S | | 12/1997 | Savicki | |
| 5,711,564 A | | 1/1998 | Campbell | |
| 5,738,399 A | | 4/1998 | Mitchell | |
| D416,359 S | | 11/1999 | Schlueter | |
| D426,353 S | | 6/2000 | Renforth | |
| 6,196,600 B1 | | 3/2001 | Miller | |
| 6,312,029 B1 | | 11/2001 | Renforth | |
| D485,025 S | | 1/2004 | Edwards et al. | |
| 7,047,907 B1 | | 5/2006 | Johnston | |
| D533,975 S | | 12/2006 | Kelly et al. | |
| 7,523,973 B2 | | 4/2009 | Lin et al. | |
| 8,348,315 B2 | | 1/2013 | Morris | |
| D679,875 S | | 4/2013 | Myerson | |
| 8,544,917 B2 | | 10/2013 | St James | |
| D718,006 S | | 11/2014 | Sikora et al. | |
| 8,967,693 B2 | | 3/2015 | Young et al. | |
| D768,342 S | | 10/2016 | Myerson | |
| D775,436 S | | 12/2016 | Rodriguez | |
| 9,693,533 B2 | | 7/2017 | Taylor et al. | |
| 2004/0227364 A1 | | 11/2004 | Pain et al. | |
| 2005/0173935 A1 | | 8/2005 | Pain et al. | |

* cited by examiner

LITTER SCOOP FOR NON-CLUMPING PELLETED LITTERS

RELATED APPLICATIONS

The present application claims priority to U.S. Provisional Application No. 62/590,957, entitled "Cat Litter Scoop for non-clumping pelleted litters," filed Nov. 27, 2017, which is incorporated herein by reference in its entirety.

TECHNICAL AREA

The presently disclosed subject matter relates generally to scoops, and more particularly to litter scoops for collecting and disposing of wet, powder grains and recycling dry pelleted litter from used pet litter materials.

BACKGROUND

Traditional pet litters for cats and other small animals are granular and clump when moistened. Conventional litter scoops are consequently designed with holes or slits to allow clumps and solid waste to stay above the holes or slits to facilitate their disposal. Loose grains of unused litter fall through the holes or slits back into the litter tray.

Alternatively, non-clumping pelleted or tableted litter can be used for cats and other small animals. In general, the pelleted non-clumping litter will absorb moisture, which generally causes the pellet or tablet to expand and become friable, loose wet grains of powder. These grains of loose powdery material cannot be scooped out of the litter box or tray with traditional cat litter scoops, since the holes or slits of conventional scoops allow clumps and solid waste (i.e., used litter) to stay above the holes or slits, and allow loose grains of litter to fall through the holes or slits back into the litter tray.

With pelleted litter, where the pellets expand and become friable or become grains of powder, a scoop system is needed for removing the wet friable powder, while at the same time enabling the return of unused dry pellets to the litter tray.

SUMMARY

The present disclosure provides a multi-piece scoop usable for, but not limited to, scooping pelleted pet litter to separate used litter from unused litter.

In one embodiment, a pet litter scoop for separating unused litter pellets from used litter comprises a scoop portion having a sieved top scoop portion and a solid bottom scoop portion, and a hollow tubular handle disposed at the back end of the scoop portion in fluid communication with the bottom scoop portion. The bottom scoop portion comprises a floor having a leading edge proximal to the front end of the scoop portion, a pair of opposing side edges, a back edge proximal to the back end of the scoop portion and in fluid communication with the handle, and a wall extending upward from the side edges and leading edge. The top scoop portion comprises a central section having openings sized such that the unused litter pellets cannot pass through the openings and the used litter passes through the openings, a leading edge proximal to the front end of the scoop portion, a pair of opposing side edges, and a back edge proximal to the back end of the scoop portion. The wall of the bottom scoop portion is shaped such that the leading edge and side edges of the top scoop portion are engageable with an upper edge of the wall such that the floor of the bottom scoop portion and the central section of the top scoop portion are spaced from each other.

In another embodiment, a pet litter scoop for separating unused litter pellets from used litter comprises a two-piece scoop portion having opposing front and back ends, the scoop portion comprising a sieved top scoop portion and a solid bottom scoop portion, the top and bottom scoop portions being pivotably connected to each other at the back end of the scoop portion; and a handle disposed at the back end of the scoop portion. The bottom scoop portion comprises a floor, the floor having a leading edge proximal to the front end of the scoop portion, a pair of opposing side edges, and a back edge proximal to the back end of the scoop portion, the bottom scoop portion further comprising a wall extending upward from the side edges and back edge of the floor. The top scoop portion comprises a central section having openings sized such that the unused litter pellets cannot pass through the openings and the used litter passes through the openings, a leading edge proximal to the front end of the scoop portion, a pair of opposing side edges, and a back edge proximal to the back end of the scoop portion. The wall of the bottom scoop portion is engageable with the side and back edges of the top scoop portion, and is shaped such that the leading edge of the top scoop portion is engaged with the leading edge of the bottom scoop portion when the wall is engaged with the side and back edges of the top scoop portion. The top and bottom scoop portions are pivotally movable relative to each other from a first position where the leading edge of the top scoop portion is engaged with the leading edge of the bottom scoop portion and the wall is engaged with the side and back edges of the top scoop portion, to a second position where the leading edge and side edges of the top scoop portion are spaced from the leading edge and the wall of the bottom scoop portion. The wall is further shaped such that the floor of the bottom scoop portion and the central section of the top scoop portion are spaced from each other when the top and bottom scoop portions are in the first position.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified. In the following drawings, like reference numerals generally indicate identical, functionally similar, and/or structurally similar elements.

DETAILED DESCRIPTION

In general, embodiments of the disclosed subject matter include (i.e., comprise) a multi-piece scoop which can be used for, but is not limited to, scooping pet litter to separate used litter from unused litter. Embodiments of the disclosed subject matter includes a litter scoop that will work with a non-clumping pelleted or tableted litter made from various substances such as wood shavings, bamboo, paper, coir, etc., for example, but not limited to, cat and other small animal litters.

With pelleted litter, where the pellets expand and become friable or grains of powder, a scoop system is needed for removing the wet friable powder, but at the same time, is able to put back into the tray the still dry pellets. To achieve this, embodiments of the presently disclosed subject matter disclose a scoop with dual scoop surfaces that are spaced from each other. A top, sieved-type surface of the scoop acts in the same way as traditional scoops whereby grains of powder falls through holes or slits. However, instead of the powder falling back into the litter, it is captured by a second scoop layer that is solid without holes or slits and located below the top, sieved-type surface. In this way, the wet grains of powder are caught in the bottom of the scoop. What remains on the top and has not fallen through the holes or slits are dry litter pellets, which can be simply poured back into the tray, while the powder is held in the bottom of the scoop. The disclosed scoops each have a mechanism to empty the powder from the bottom of the scoop.

In one embodiment of the disclosed scoop shown in FIGS. 14-21, the used litter powder is emptied through a hollow scoop handle in fluid communication with the bottom of the scoop. In other embodiments shown in FIGS. 1-13, the top and bottom scoop surfaces are pivotably joined together with a thumb press hinge mechanism to lift up or rotate the top portion of the scoop away from the bottom portion to allow for any contents in the bottom portion to be emptied into the trash.

In general, one or more embodiments of the disclosed subject matter can include (i.e., comprise) a multi-piece scoop, which can be used for, but is not limited to, scooping cat litter to separate used litter from unused litter. The multi-piece scoop includes a two piece, hinged scoop portion with a top sieved-type scoop portion and a solid bottom scoop portion, a detachable handle, and a hinge adapted and configured to connect the handle to the multi-piece scoop portion and permit the opening and closing of the top sieved scoop portion and the solid bottom scoop portion of the multi-piece scoop. The multi-piece scoop can be made from a variety of materials, for example, but not limited to, plastic, metal, resins, composites, etc., and methods, for example, but not limited to, injection molding, extrusion molding, thermoforming, compression molding, 3D printing, computer numerical control (CNC) cutting and assembly via welding, adhesives and/or fasteners.

Figure 1:
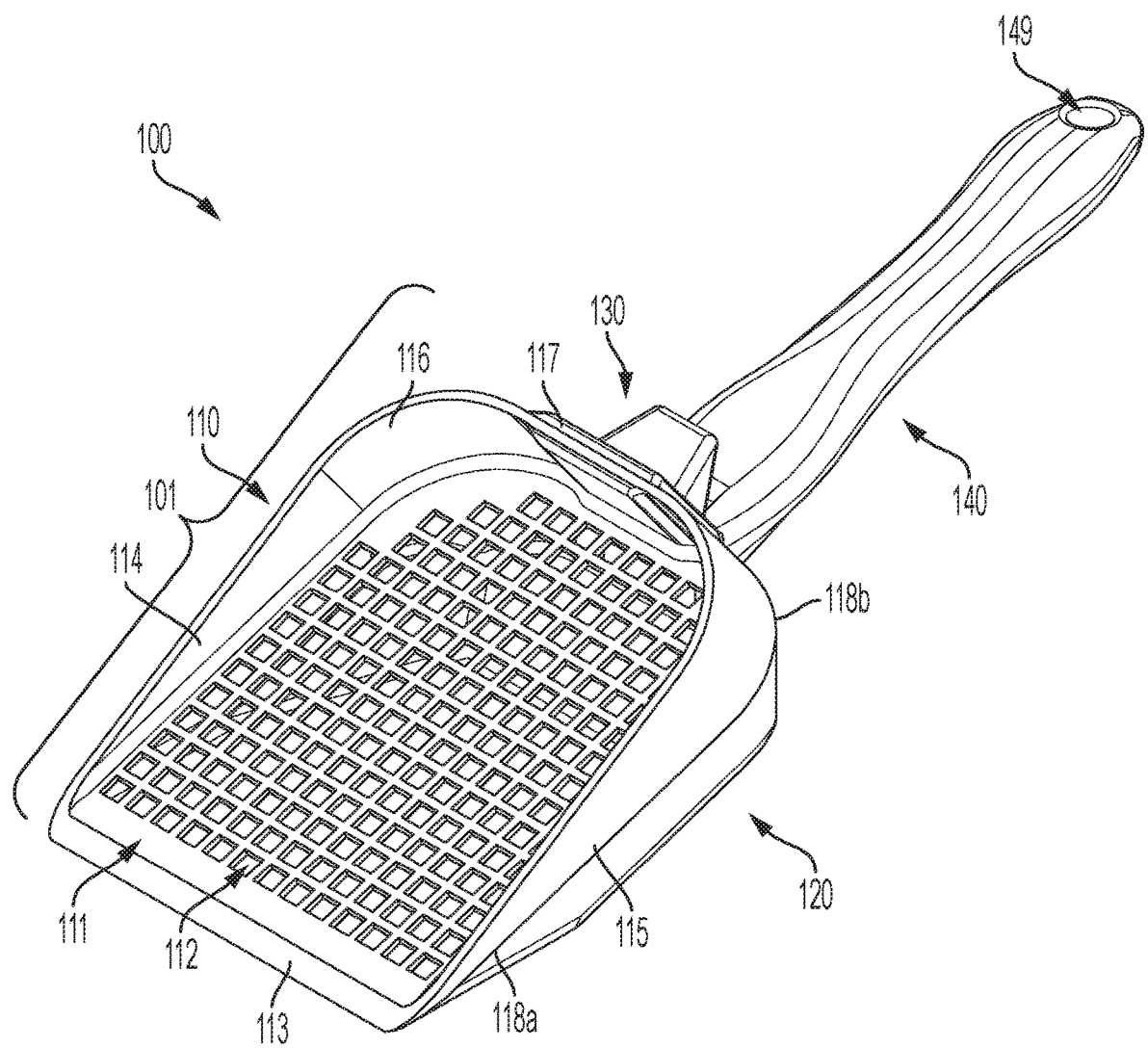
FIG. 1 depicts a top front perspective view of a litter scoop in a closed position, in accordance with an exemplary embodiment of the disclosed subject matter.

An exemplary embodiment of the disclosed subject matter will now be described with reference to FIGS. 1-8. As shown in FIG. 1, a litter scoop 100 includes a scoop portion 101 with a sieved top scoop portion 110 rotatably connected to a solid bottom scoop portion 120 by a pivot such as a thumb press hinge element 130, which can also be connected to a handle 140.

A central bottom section 111 of the scoop top portion 110 has multiple openings 112 formed there through. The openings 112 can be equivalently sized and shaped; for example, a substantially square shape as in FIG. 1, but they can also have different shapes, such as circular, oval, rectangular, triangular, etc. In general, openings 112 are smaller than the unused litter product, so it does not pass through the openings 112 and into the bottom scoop portion 120, but are sufficiently sized to permit the used product to fall through the openings 112 and be caught in the bottom scoop portion 120. The top scoop portion 110 also has a tapered leading or front edge 113 to aid in scooping up the product to be sifted/separated.

The handle 140 can include an opening 149 formed through its distal end through which a tie, string, loop or the like can be threaded to form a carrying and/or hanging element (not shown). Similarly, the opening 149 can be used without any additional hanging element and a nail or other protrusion from a wall, edge or surface can pass through the opening 149 to permit the litter scoop 100 to be hung up for storage.

As also shown in FIG. 1, a top surface of the bottom 111 of the top scoop portion 110 is connected to an upwardly-extending wall which includes a right sidewall 114 along a right edge of the bottom 111, a left sidewall 115 along a left edge of the bottom 111, and a back sidewall 116 along at least a back edge of the bottom 111. The right sidewall 114 extends upwardly and substantially perpendicularly away from the bottom 111. Similarly, the left sidewall 115 extends upwardly and substantially perpendicularly away from the bottom 111, and the back sidewall 116 extends upwardly and inwardly away from the bottom 111. The thumb press 130 is connected to back wall 116. More particularly, in the illustrated embodiment a sleeve 117 is formed in about a middle of the back sidewall 116 and the sleeve is configured and adapted to receive and hold a reciprocally-shaped portion of the thumb press hinge element 130.

Figure 2:
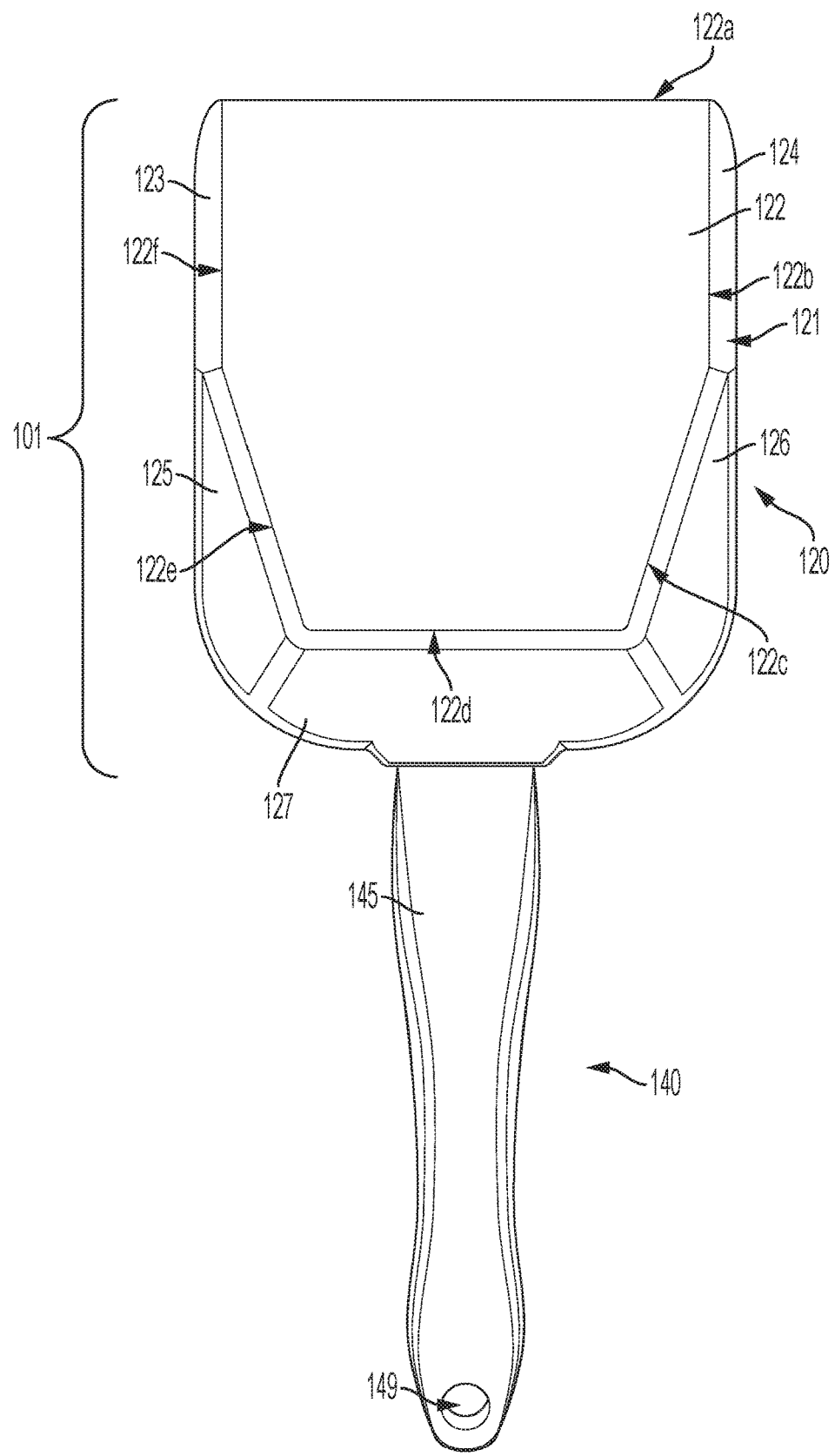
FIG. 2 depicts a bottom view of the litter scoop of FIG. 1.

FIG. 2 depicts a bottom view of the litter scoop of FIG. 1. As shown in FIG. 2, a bottom side 121 of the bottom scoop portion 120 includes a main bottom section (or floor) 122 that is substantially flat and has six side edges. The leading front side edge 122a defines a front end section of the bottom scoop portion 120 and opposite ends of the front side edge 122a connect to front ends of a pair of opposing side edges which include front side edges 122f and 122b, and back side edges 122e and 122c. Front right side edge 122f and front left side edge 122b are substantially parallel to each other and extend rearwardly and substantially perpendicularly away from the front side edge 122a. Back ends of the front right side edge 122f and the front left side edge 122b connect to front ends of back right side edge 122e and back left side edge 122c, which extend rearwardly and inwardly away from the front side edge 122a and toward a back side edge 122d proximal to the back end of the scoop portion 101. Opposite ends of the back side edge 122d connect to back ends of the back right side edge 122e and the back left side edge 122c, and the back side edge 122d is substantially parallel to the front side edge 122a.

Figure 5:
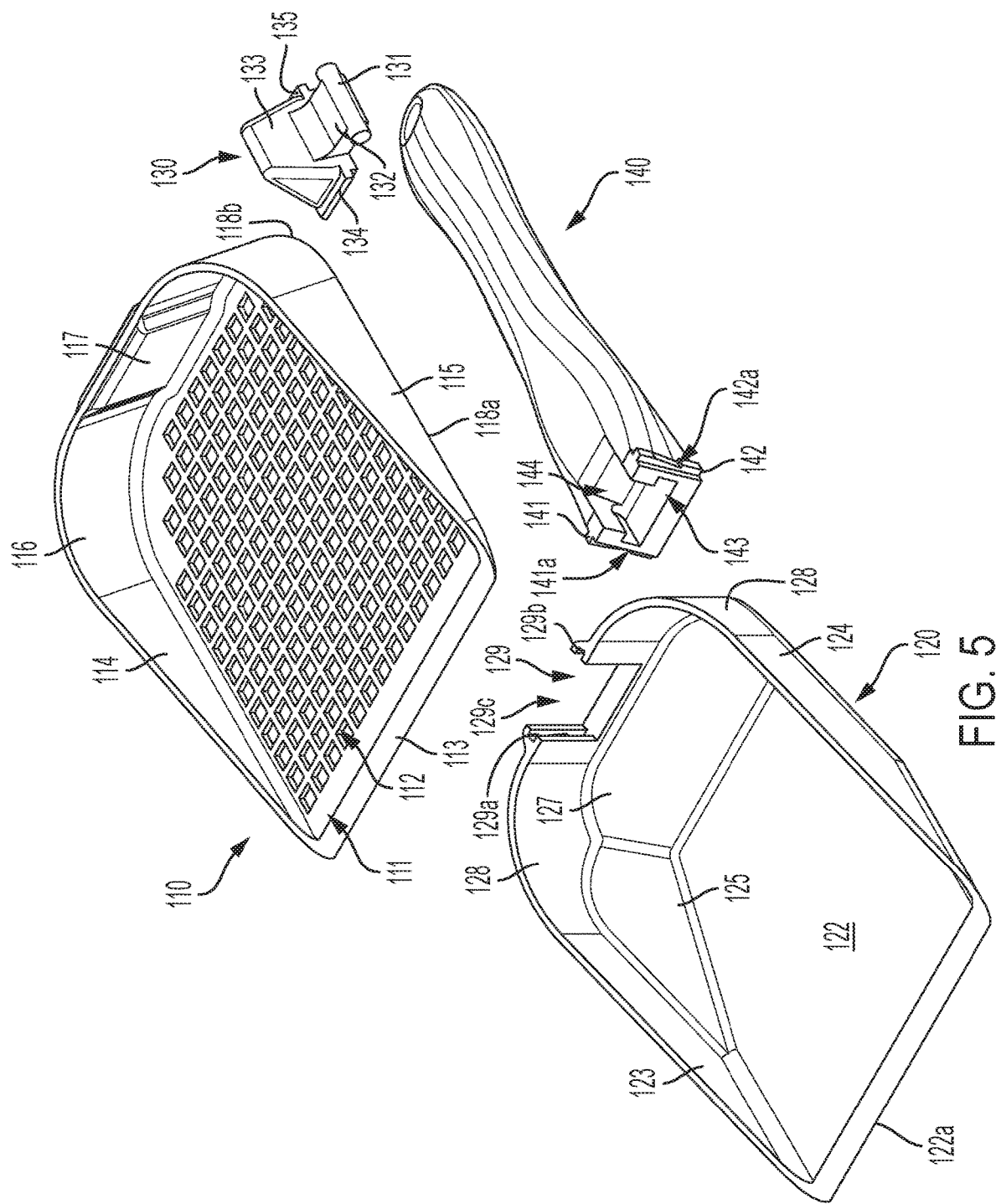
FIG. 5 depicts a perspective exploded view of the litter scoop of FIG. 1.
Figure 6:
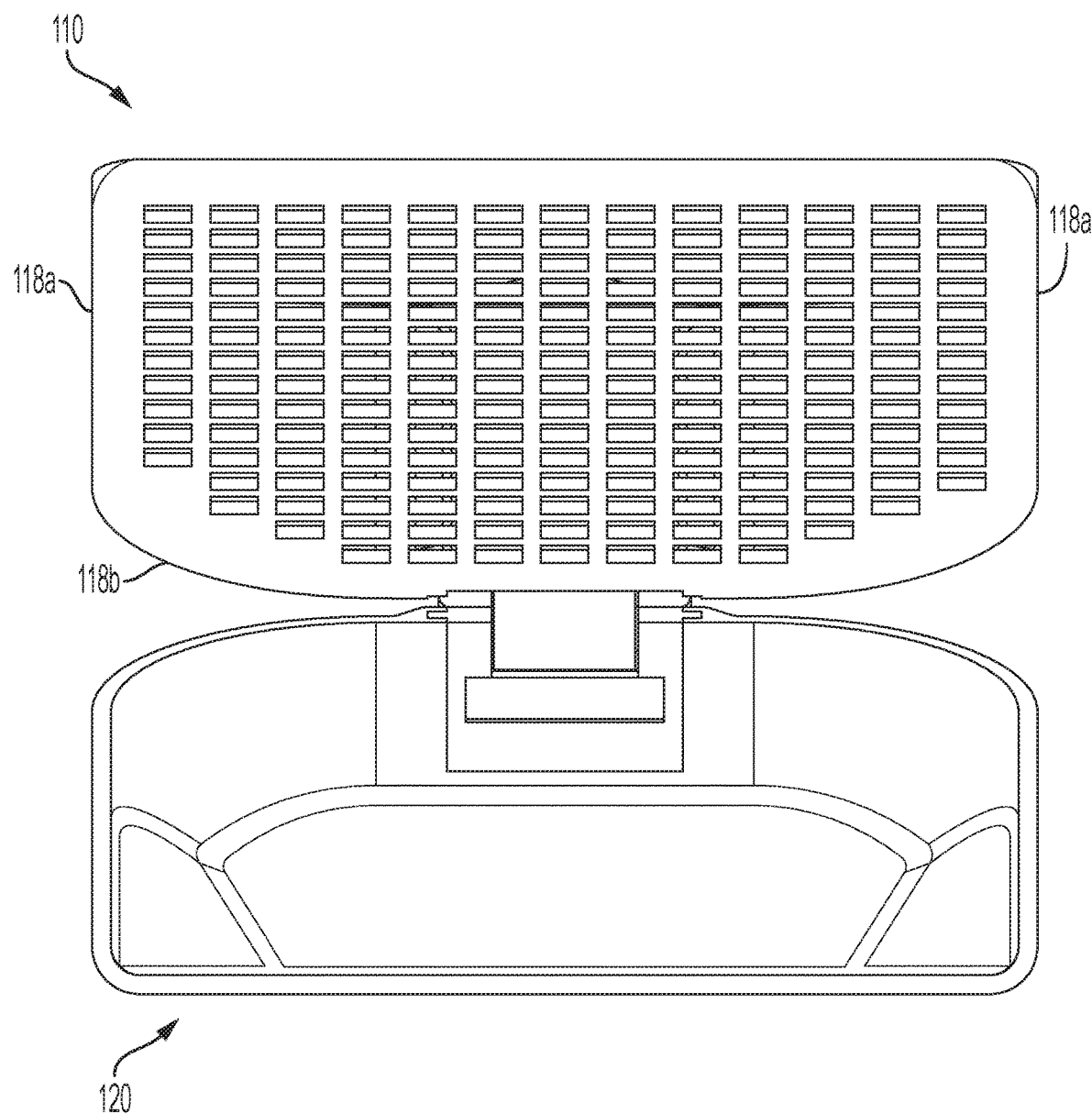
FIG. 6 depicts a front view of the open litter scoop of FIG. 4.

As shown in FIGS. 2 and 5, a wall extends upward from the side edges and back edge 122c-f of the floor 122, and includes a right front sidewall 123, a left front sidewall 124, a right back sidewall 125, a left back sidewall 126, a bottom back sidewall 127, and a top back sidewall 128. The front right side edge 122f connects along its entire length to a bottom front edge of the right front sidewall 123 and the front left side edge 122b connects along its entire length to a bottom front edge of the left front sidewall 124. Both the right front sidewall 123 and the left front sidewall 124 extend substantially perpendicularly and upwardly away from a top surface (best seen in FIG. 5) of the main bottom section 122 and rearwardly away from the front side edge 122a. A top edge of the right back sidewall 125 connects to a bottom back edge of the right front sidewall 123 and a top edge of the left back sidewall 126 connects to a bottom back edge of the left front sidewall 124. A bottom edge of the right back sidewall 125 connects to the back right side edge 122e, a bottom edge of the left back sidewall 126 connects to the back left side edge 122c, and the right back sidewall 125 and the left back sidewall 126 extend upwardly and outwardly from the top surface of the main bottom section 122. A bottom edge of the bottom back sidewall 127 connects to the back side edge 122d, and opposite side edges of the bottom back sidewall 127 connect to back side edges of the right back sidewall 125 and the left back sidewall 126.

Referring now to FIG. 5, a top back sidewall 128 is connected along a bottom edge to the top edges of the right back sidewall 125, the left back sidewall 126 and the bottom back sidewall 127. In about a middle of the top back sidewall 128 is formed a substantially square window 129 with an open top 129c and substantially parallel to each other slotted grooves 129a, 129b extending substantially perpendicularly down and away from the open top 129c. Top edges of the right front sidewall 123, the left front sidewall 124, and the top back sidewall 128 all end in the same plane to form a substantially flat surrounding top edge of the bottom scoop portion 120. This substantially flat surrounding top edge of the bottom scoop portion 120 fits tightly against a bottom surrounding edge 118a-b of the top scoop portion 110, which includes a pair of opposing side edges 118a and a back edge 118b proximal to the back end of the scoop portion 101, as seen, e.g., in FIGS. 1, 5, and 6.

To summarize the foregoing description, the bottom scoop portion 120 comprises a floor 122 having a leading edge 122a proximal to the front end of the scoop portion 101, a pair of opposing side edges 122f plus 122e, 122b plus 122c, and a back edge 122d proximal to the back end of the scoop portion 101. The bottom scoop portion 120 further comprises a wall 123-128 extending upward from the side edges and back edge 122b-f of the floor 122. The top scoop portion 110 comprises a central section 111 having openings 112 sized such that unused litter pellets cannot pass through the openings 112 and used litter passes through the openings 112, a leading edge 113 proximal to the front end of the scoop portion 101, a pair of opposing side edges 118a, and a back edge 118b proximal to the back end of the scoop portion 101. The wall 123-128 of the bottom scoop portion is engageable with the side and back edges 118a-b of the top scoop portion 110, and is shaped such that the leading edge 113 of the top scoop portion 110 is engaged with the leading edge 122a of the bottom scoop portion 120 when the wall 123-128 is engaged with the side and back edges 118a-b of the top scoop portion 110.

Returning to FIG. 2, the handle 140 can have an ergonomically contoured smooth surface around most of its surfaces. A bottom surface 145 of the handle 140 can be a substantially flat surface.

Figure 3:
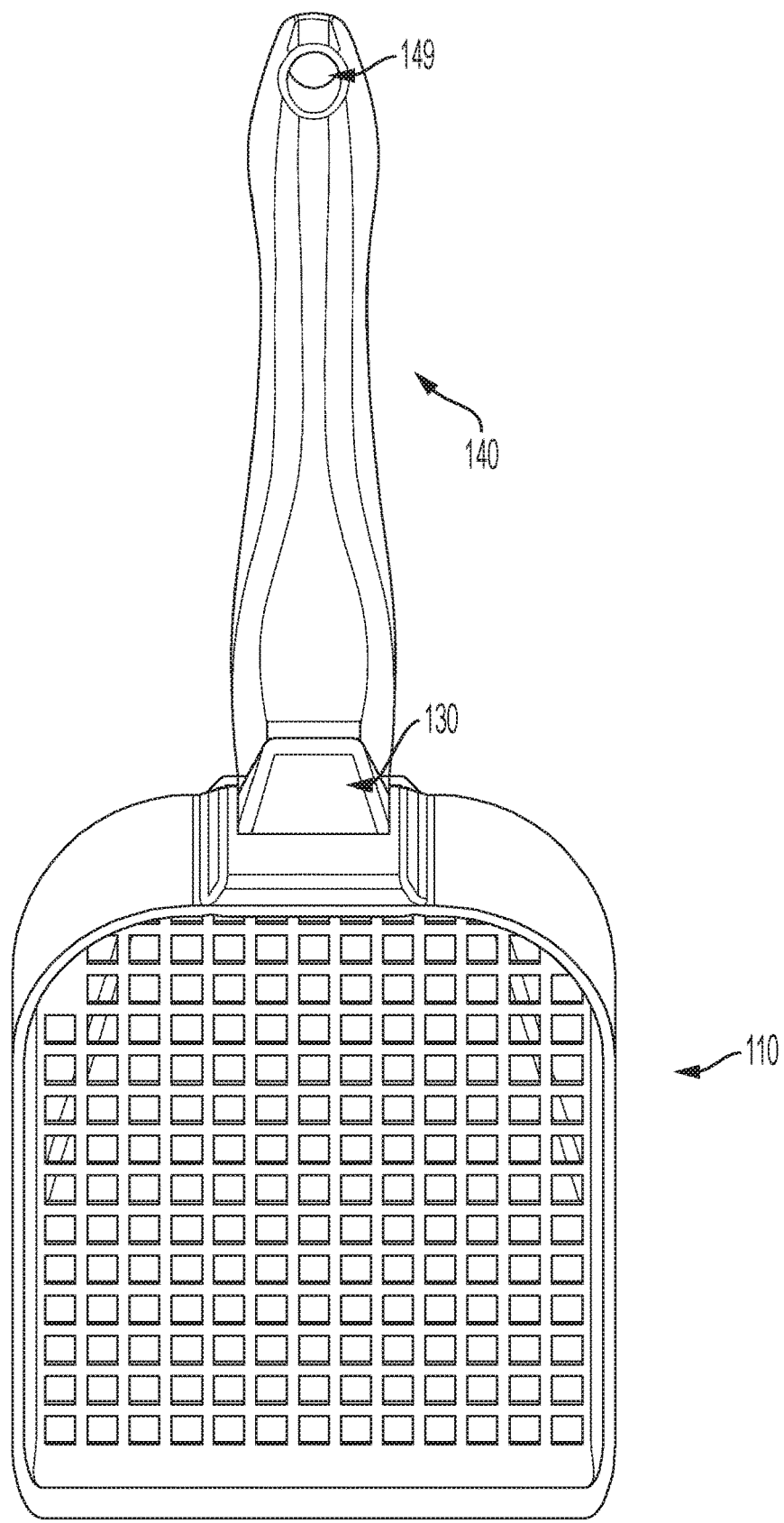
FIG. 3 depicts a top view of the litter scoop of FIG. 1.
Figure 4:
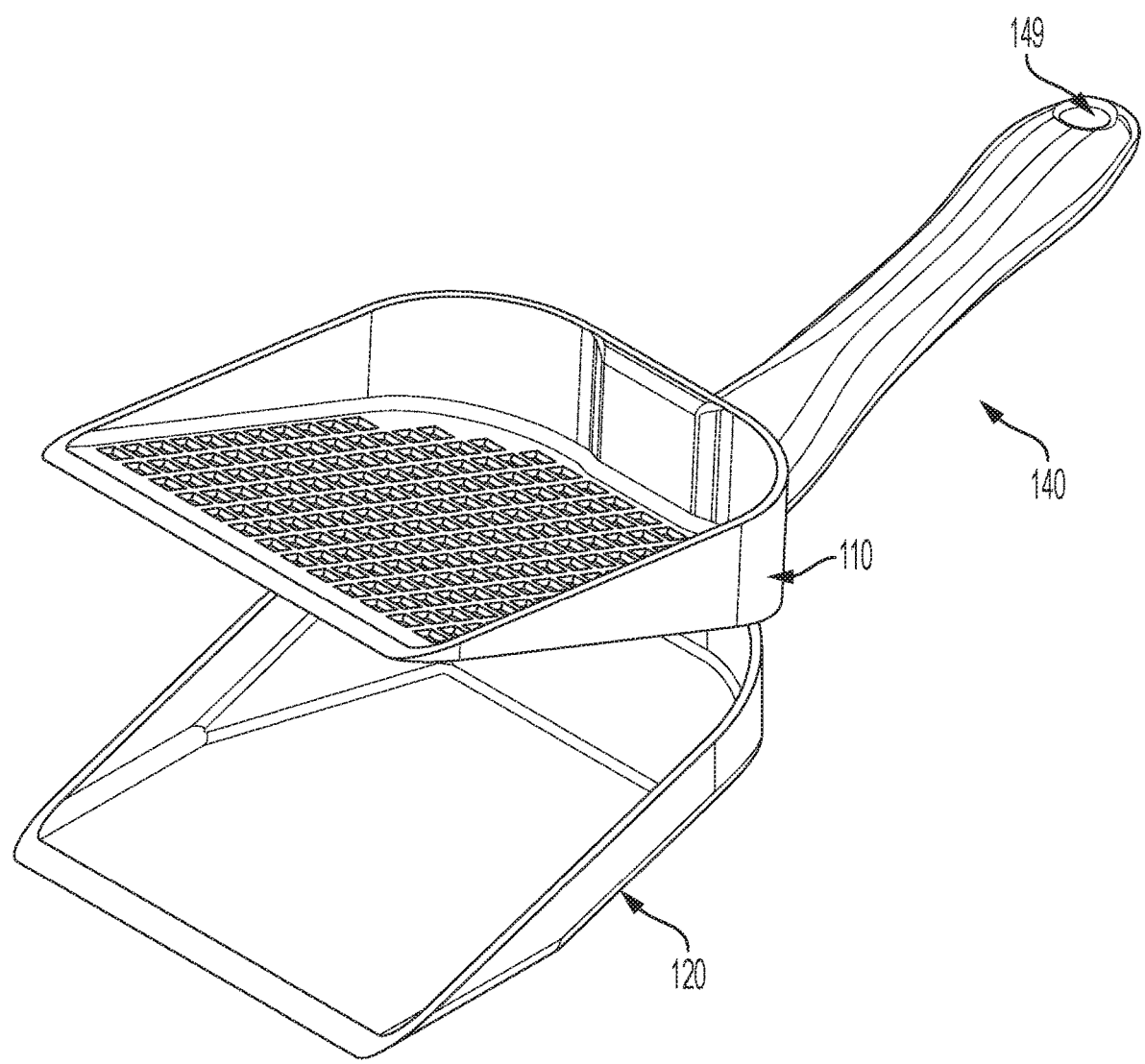
FIG. 4 depicts a top front perspective view of the litter scoop of FIG. 1 in an open position.
Figure 7:
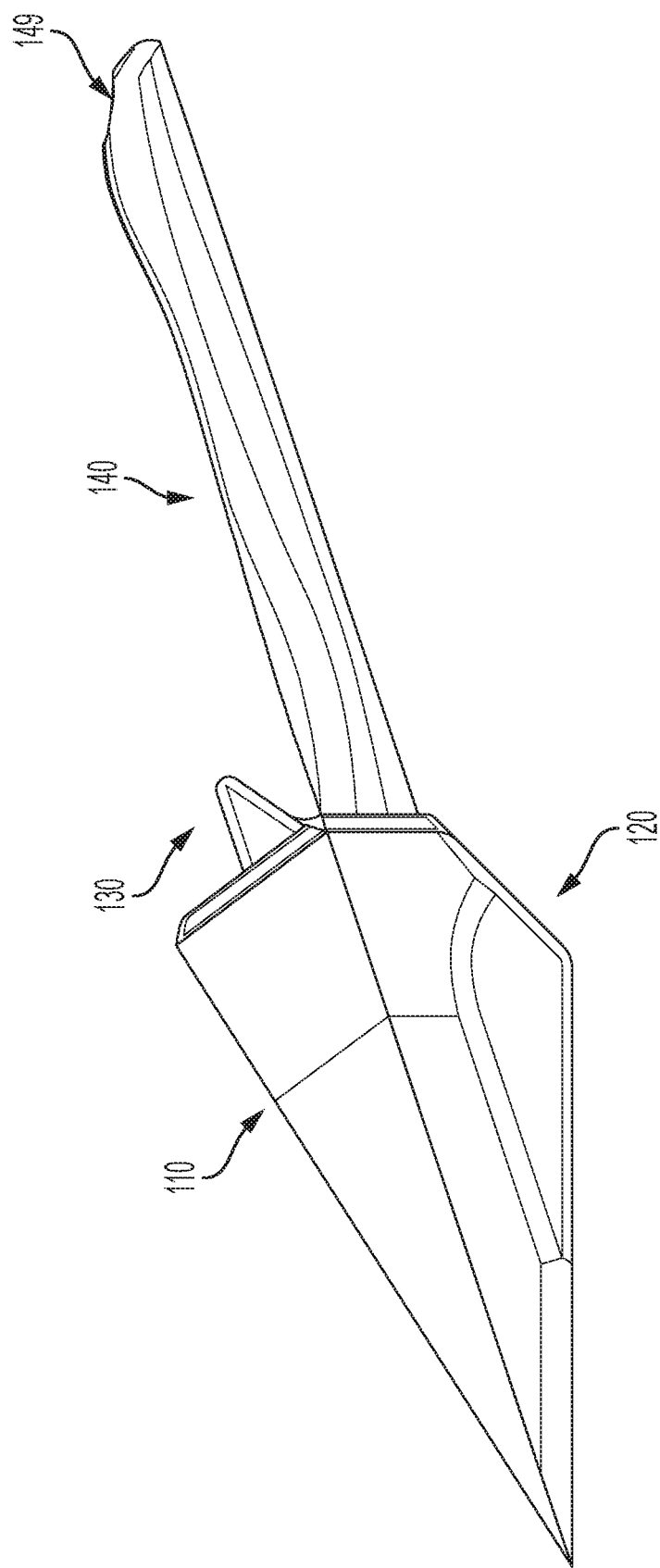
FIG. 7 depicts a left side view of the litter scoop of FIG. 1.
Figure 8:
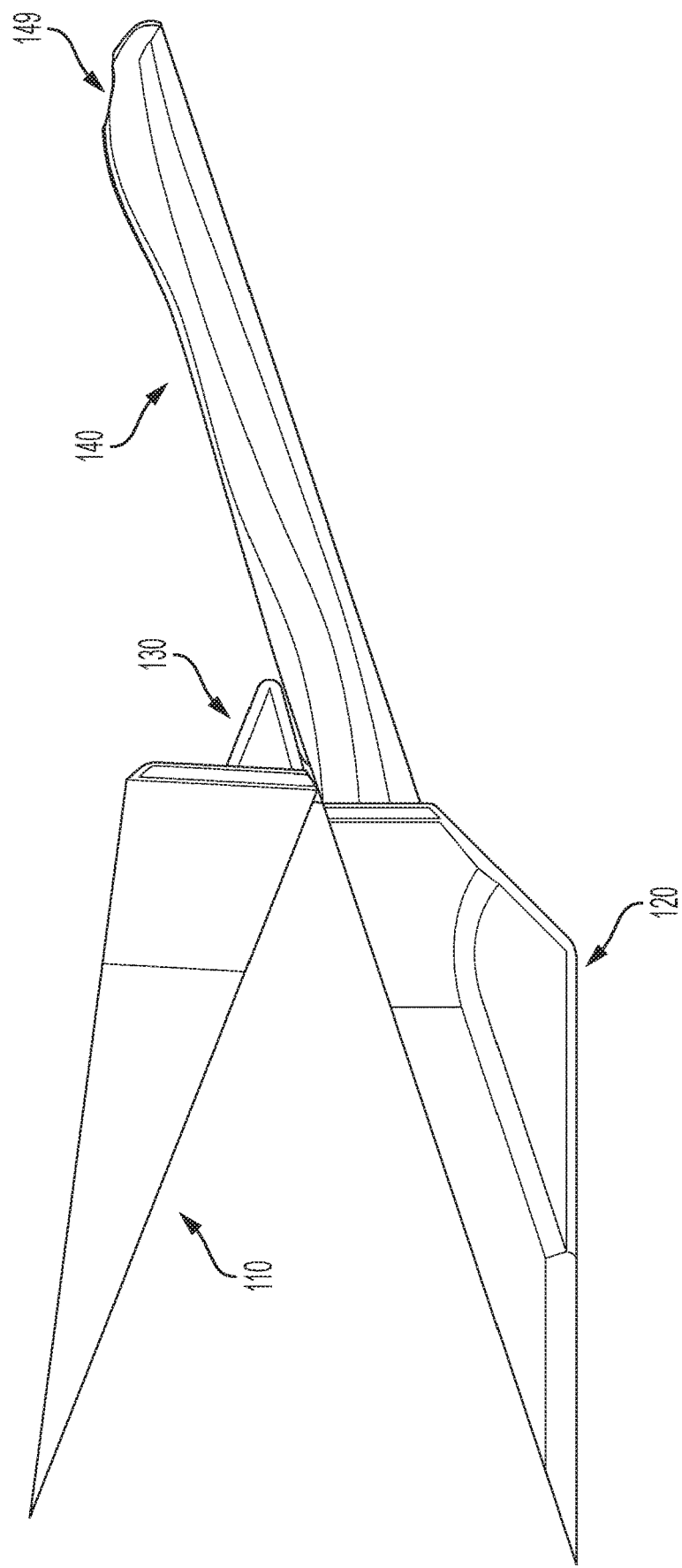
FIG. 8 depicts a left side view of the open litter scoop of FIG. 4.

Referring now to FIGS. 3 and 7, the thumb press hinge element 130 is seen in its pushed up position, which means the scoop is in a closed configuration (also referred to herein as the "first position") with the bottom scoop portion 120 immediately below and in contact with the top scoop portion 110 (see also, FIG. 1). FIG. 4 depicts a top, front perspective view of the litter scoop of FIG. 1 in an open position (also referred to herein as the "second position"). See also, FIG. 8. Thus, the thumb press 130 is for moving the top scoop portion 110 from the first position to the second position when a user is holding the handle 140.

Accordingly, the top and bottom scoop portions 110, 120 are pivotally movable relative to each other from the first position where the leading edge 113 of the top scoop portion 110 is engaged with the leading edge 122a of the bottom scoop portion 120 and the wall 123-128 of the bottom scoop portion 120 is engaged with the side and back edges 118 of the top scoop portion 110, to the second position where the leading edge 113 and side edges 118a of the top scoop portion 110 are spaced from the leading edge 122a and the wall 123-128 of the bottom scoop portion 120. Note that when the top and bottom scoop portions 110, 120 are in the first position, an extreme front end of the leading edge 113 of the top scoop portion engages an extreme front end of the leading edge 122a of the bottom scoop portion. Also, due to the shape of the wall 123-128, the floor 122 of the bottom scoop portion 120 and the central section 111 of the top scoop portion 110 are spaced from each other when the top and bottom scoop portions are in the first position.

Thus, the scoop 100 is for scooping unused litter pellets and used litter when the top and bottom scoop portions 110, 120 are in the first position, and for removing the used litter that has passed through the openings 112 in the top scoop portion 110 from the bottom scoop portion 120 when the top and bottom scoop portions are in the second position.

Referring again to FIG. 5, the slotted grooves 129a, 129b are configured and adapted to receive reciprocally-shaped raised edges 141, 142 formed on a proximal end of the handle 140. In one or more embodiments of the disclosed subject matter, both reciprocally-shaped raised edges 141, 142 can have angled indents 141a, 142a in around about a middle of each of the reciprocally-shaped raised edges 141, 142 and the slotted grooves 129a, 129b can have reciprocally-shaped raised detents that cooperate with the angled indents 141a, 142a to lock the handle in place in the substantially square window 129 in the top back sidewall 128. In some of these embodiments, the handle 140 is designed to be permanently locked to the bottom scoop portion 120, while in other embodiments, the handle 140 is designed to not be permanently locked to the bottom scoop portion 120, so the litter scoop 100 can be disassembled and reassembled.

As also shown in FIG. 5, the proximal end of the handle 140 has two hollowed-out portions, a hinge axle groove 143 and a hinge access groove 144, which are configured and adapted to rotatably receive the thumb press hinge element 130. Specifically, the hinge axle groove 143 is configured and adapted to rotatably receive a hinge axle portion 131 of the thumb press hinge element 130 and the hinge access groove 144 is configured and adapted to permit a hinge leg 132 to move backward toward the distal end of the handle 140 when a thumb press portion 133 of the thumb press hinge element 130 is pulled down toward the handle 140 and forward toward the proximal end of the handle 140 when the thumb press portion 133 of the thumb press hinge element 130 is pushed up and away from the handle 140.

The thumb press hinge element 130 also includes a pair of ridges 134, 135 that are configured and adapted to engage reciprocally-shaped grooves (not shown) formed in sleeve 117. In embodiments of the disclosed subject matter, the ridges 134, 135 and reciprocally-shaped grooves can be configured to permit the removal and replacement of the top scoop portion 110 or to more permanently connect the two pieces together, for example, using structures similar to the reciprocally-shaped raised edges 141, 142 of the handle 140 which can be inserted into the slotted grooves 129a, 129b of the bottom scoop portion 120.

The litter scoop elements of FIG. 5 can be assembled into the complete litter scoop by, for example, but not limited to, inserting the hinge axle portion 131 of the thumb press hinge element 130 into the hinge axle groove 143 with the thumb press portion 133 extending toward the distal end of the handle 140. The reciprocally-shaped raised edges 141, 142 of the handle 140 can be inserted into the slotted grooves 129a, 129b of the bottom scoop portion 120 and pushed down until they each snap into place. The ridges 134, 135 of the thumb press hinge element 130 can be inserted into the reciprocally-shaped grooves (not shown) formed in sleeve 117.

Figure 9:
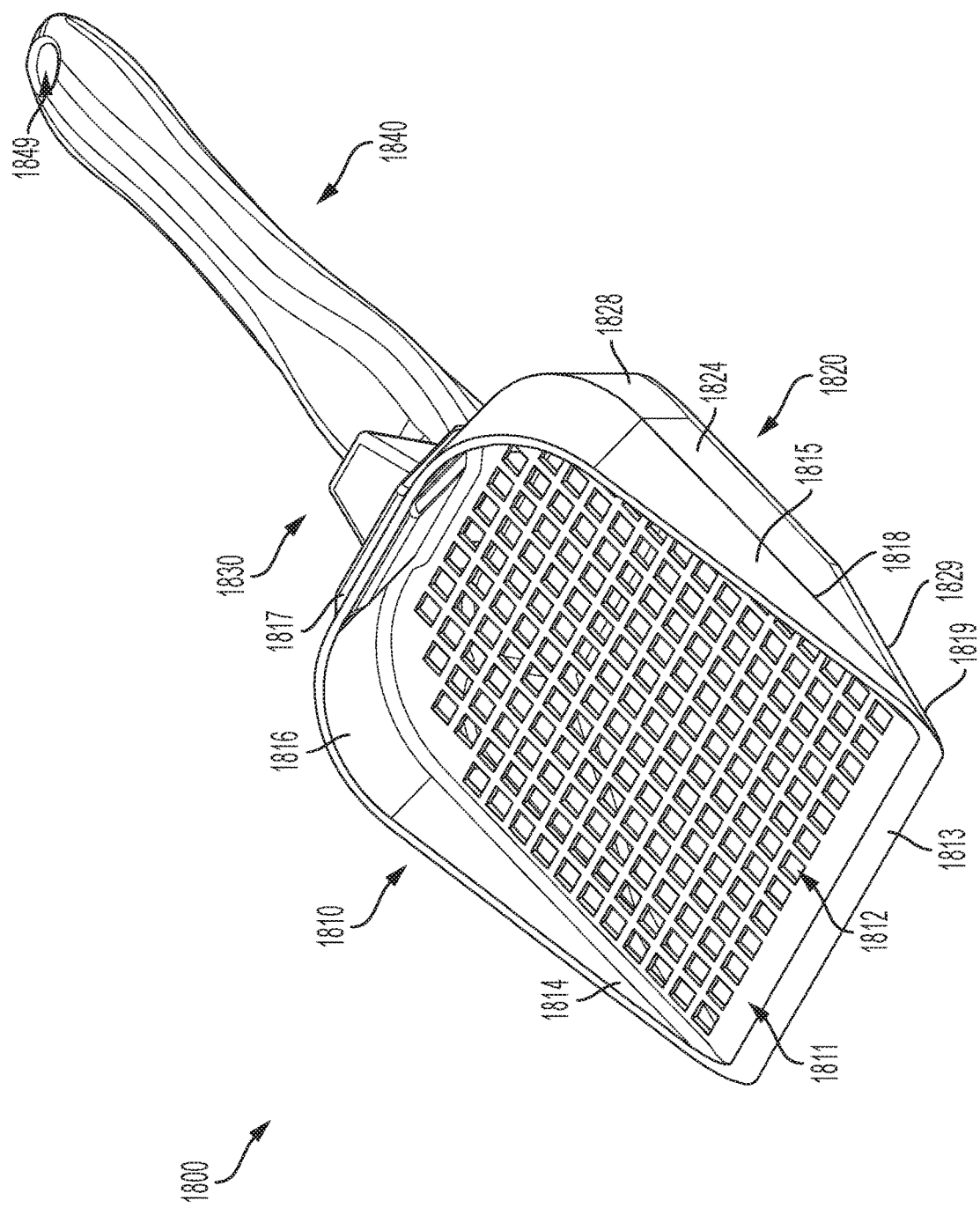
FIG. 9 depicts a top front perspective view of a litter scoop in a closed position, in accordance with a further exemplary embodiment of the disclosed subject matter.

A further exemplary embodiment of the disclosed litter scoop will now be described with reference to FIGS. 9-13. As shown in FIG. 9, a litter scoop 1800 includes a sieved top scoop portion 1810 rotatably connected to a solid bottom scoop portion 1820 by a pivot such as a thumb press hinge element 1830, which can also be connected to a handle 1840. Thus, similarly to the scoop 100 of FIGS. 1-8, the top and bottom scoop portions 1810, 1820 are movable via thumb press 1830 from a closed configuration shown in FIG. 9 (also referred to herein as the "first position") to an open position shown in FIG. 11 (also referred to as the "second position").

A central bottom 1811 of the scoop top portion 1810 has multiple openings 1812 formed there through. The openings 1812 can be equivalently sized and shaped; for example, a substantially square shape, but they can also have other shapes, such as circular, oval, rectangular, triangular, etc. The openings 1812 are smaller than the unused litter product, so it does not pass through the openings 1812 and into the bottom scoop portion 1820, but are sufficiently sized to permit the used product to fall through the openings 1812 and be caught in the bottom scoop portion 1820. The top scoop portion 1810 also has a tapered leading or front edge 1813 to aid in scooping up the product to be sifted/separated.

Figure 10:
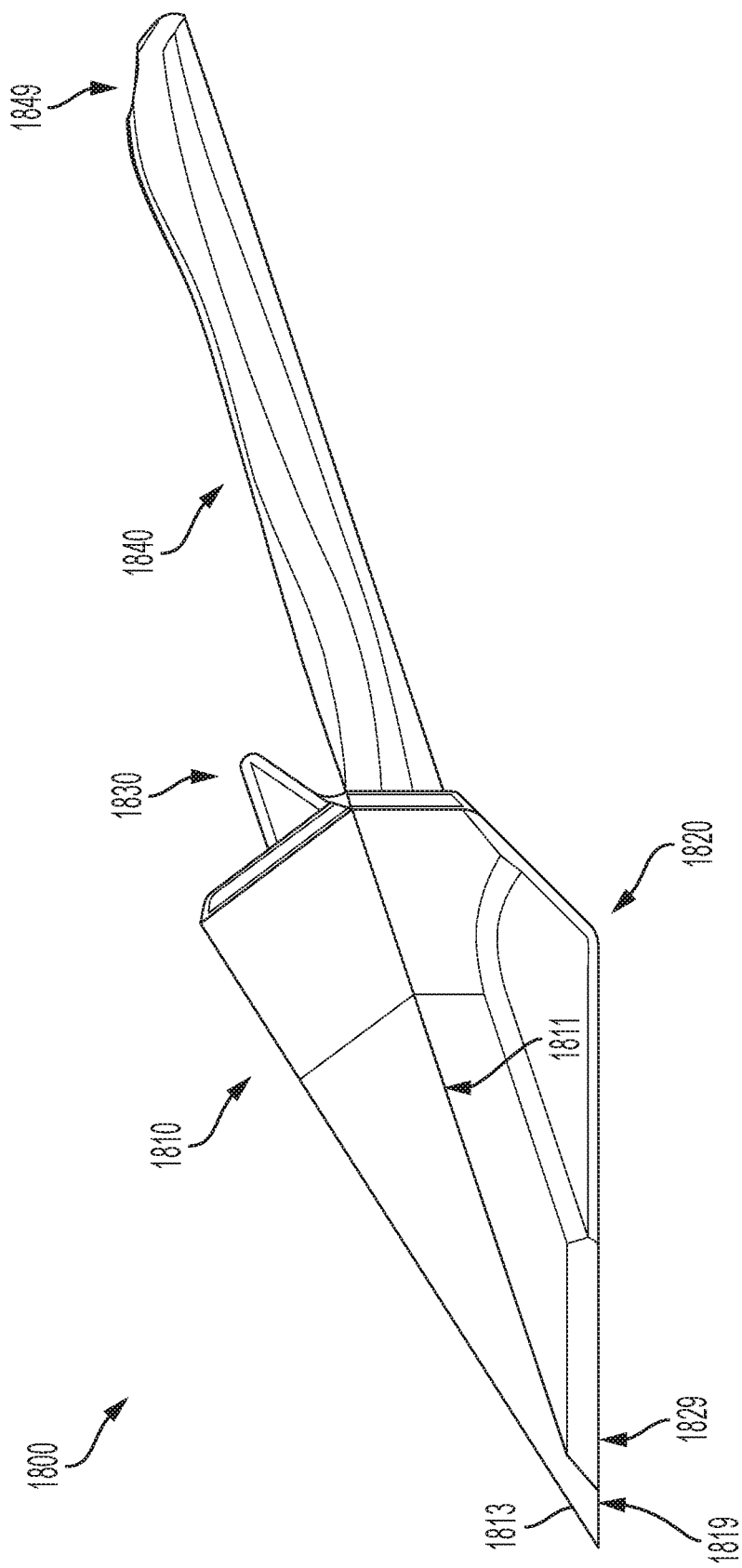
FIG. 10 depicts a left side view of the litter scoop of FIG. 9.
Figure 11:
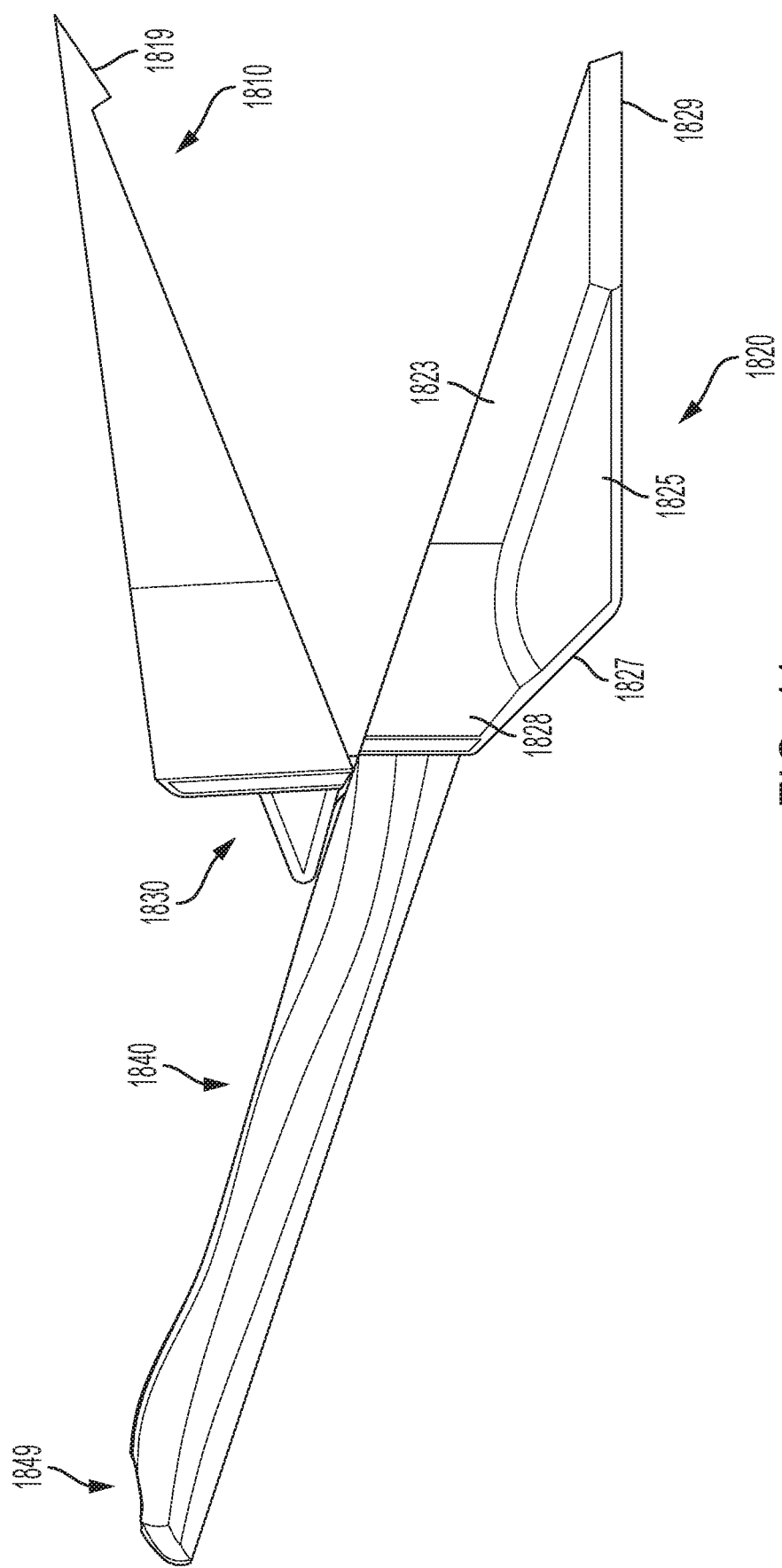
FIG. 11 depicts a right side view of the litter scoop of FIG. 9 in an open position.
Figure 12:
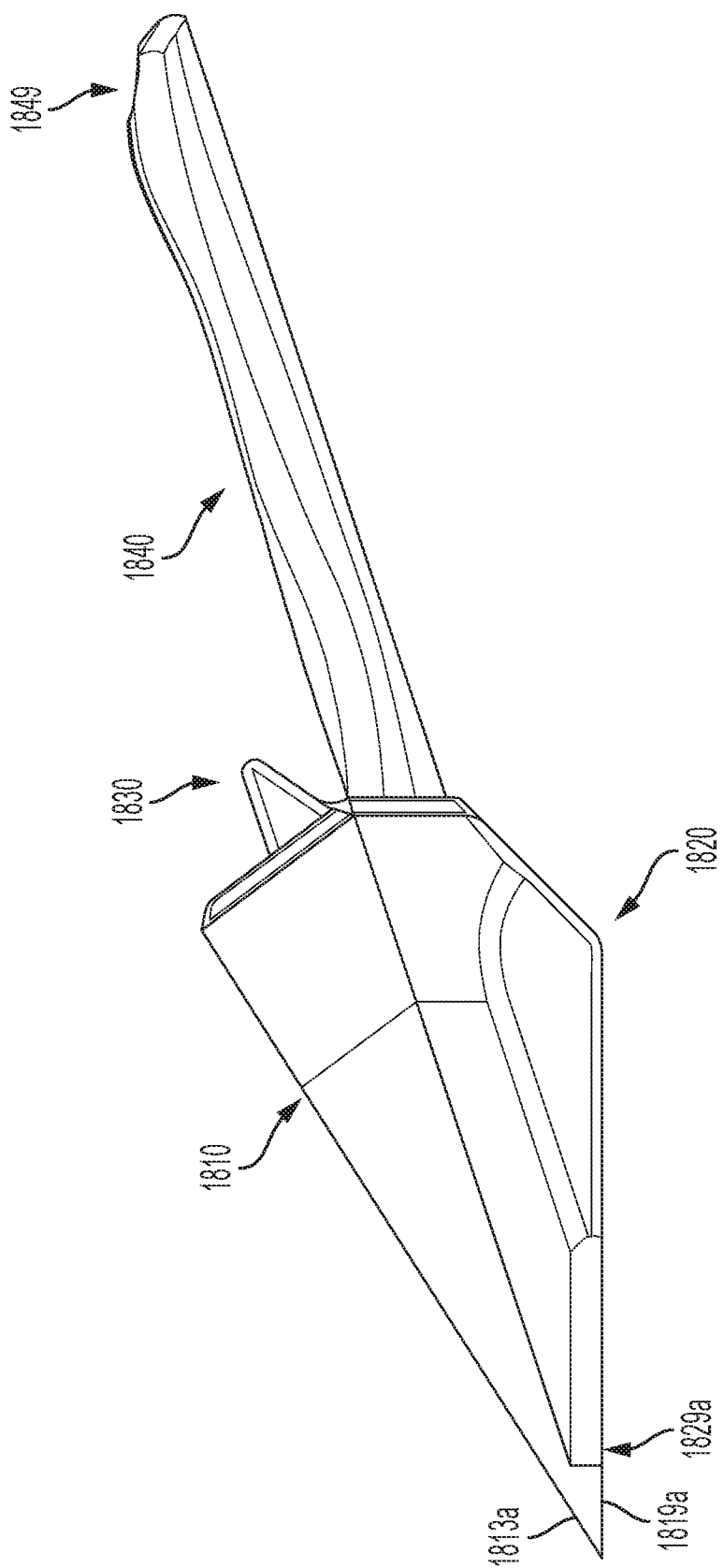
FIG. 12 depicts a left side view of a litter scoop in a closed position, in accordance with another exemplary embodiment of the disclosed subject matter.

However, unlike the scoop 100 of FIG. 1, the tapered front edge 1813 of scoop 1800 includes a tapered bottom edge 1819 below the tapered front edge 1813. As shown in FIG. 10, tapered bottom edge 1819 has a back end that angles upwardly and backwardly to join the bottom 1811 of the top scoop portion 1810. The bottom scoop portion 1820 has a front end 1829 that is reciprocally angled to the tapered bottom edge 1819 so that when in the closed position the tapered bottom edge 1819 is in front of the front end 1829 of the bottom scoop portion 1820. As seen in FIGS. 10 and 11, the tapered bottom edge 1819 and the front end 1829 of the bottom scoop portion 1820 are at reciprocal angles to enable them to overlay each other. Thus, when the top and bottom scoop portions 1810, 1820 are in the closed (first) position, an extreme front end of the leading edge 1813 of the top scoop portion 1810 is disposed in front of an extreme front end of the leading edge 1829 of the bottom scoop portion 1820.

The handle 1840 can include an opening 1849 formed through its distal end through which a tie, string, loop or the like can be threaded to form a carrying and/or hanging element (not shown). Similarly, the opening 1849 can be used without any additional hanging element and a nail or other protrusion from a wall, edge or surface can pass through the opening 1849 to permit the litter scoop 1800 to be hung up for storage.

In FIG. 9, a top surface of the bottom 1811 of the top scoop portion 1810 is connected to an upwardly-extending wall which includes a right sidewall 1814 along a right edge of the bottom 1811, a left sidewall 1815 along a left edge of the bottom 1811, and a back sidewall 1816. The right sidewall 1814 extends upwardly and substantially perpendicularly away from the bottom 1811. Similarly, the left sidewall 1815 extends upwardly and substantially perpendicularly away from the bottom 1811, and the back sidewall 1816 extends upwardly and inwardly away from the bottom 1811. The thumb press 1830 is connected to back wall 1816. More particularly, in the illustrated embodiment a sleeve 1817 is formed in about a middle of the back sidewall 1816 and the sleeve is configured and adapted to receive and hold a reciprocally-shaped portion of the thumb press hinge element 1830.

In the embodiment of FIG. 9, the back of the tapered bottom edge 1819 and the front end 1829 of the bottom scoop portion 1820 are at reciprocal angles to enable them to overlay each other. However, in still another embodiment of the disclosed subject matter shown in FIG. 12, the tapered bottom edge 1819a and the front end 1829a of the bottom scoop portion 1820 can be perpendicular to the bottom of the bottom scoop portion 1820 and parallel to each other, so they abut each other in the closed position. This embodiment is otherwise identical to that of FIG. 9. Regardless of the embodiment, opposite portions of a releasable fastening mechanism (not shown) can be positioned on the tapered bottom edge 1819 or 1819a and the front end 1829 or 1829a of the bottom scoop portion 1820, and configured to engage each other when the scoop 1800 is closed. This engagement helps to keep the scoop 1800 in the closed position during the scooping process, but is easily releasable when the user wants to open the scoop 1800.

Figure 13:
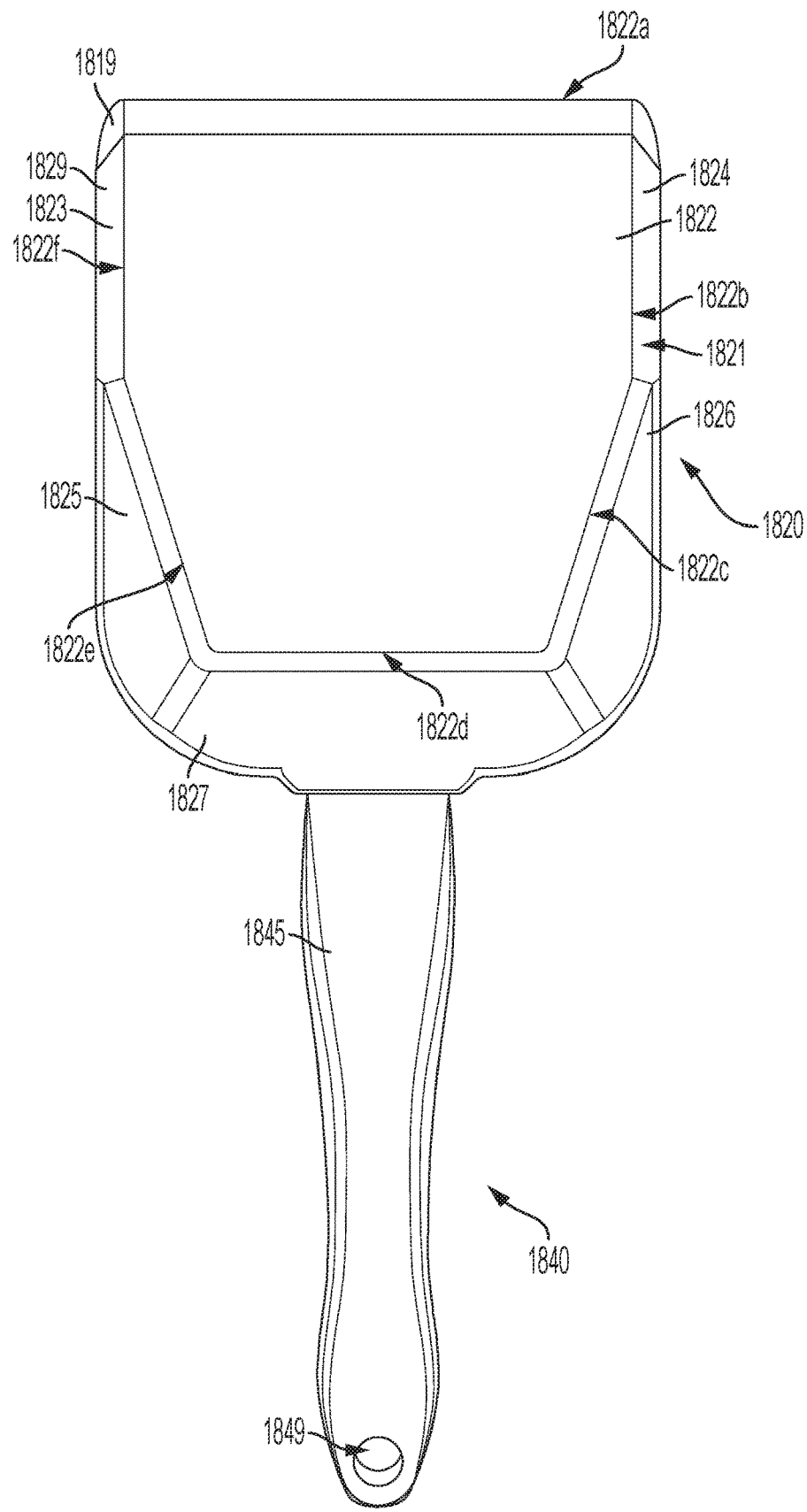
FIG. 13 depicts a bottom view of the litter scoops of FIGS. 9-12.
Figure 14:
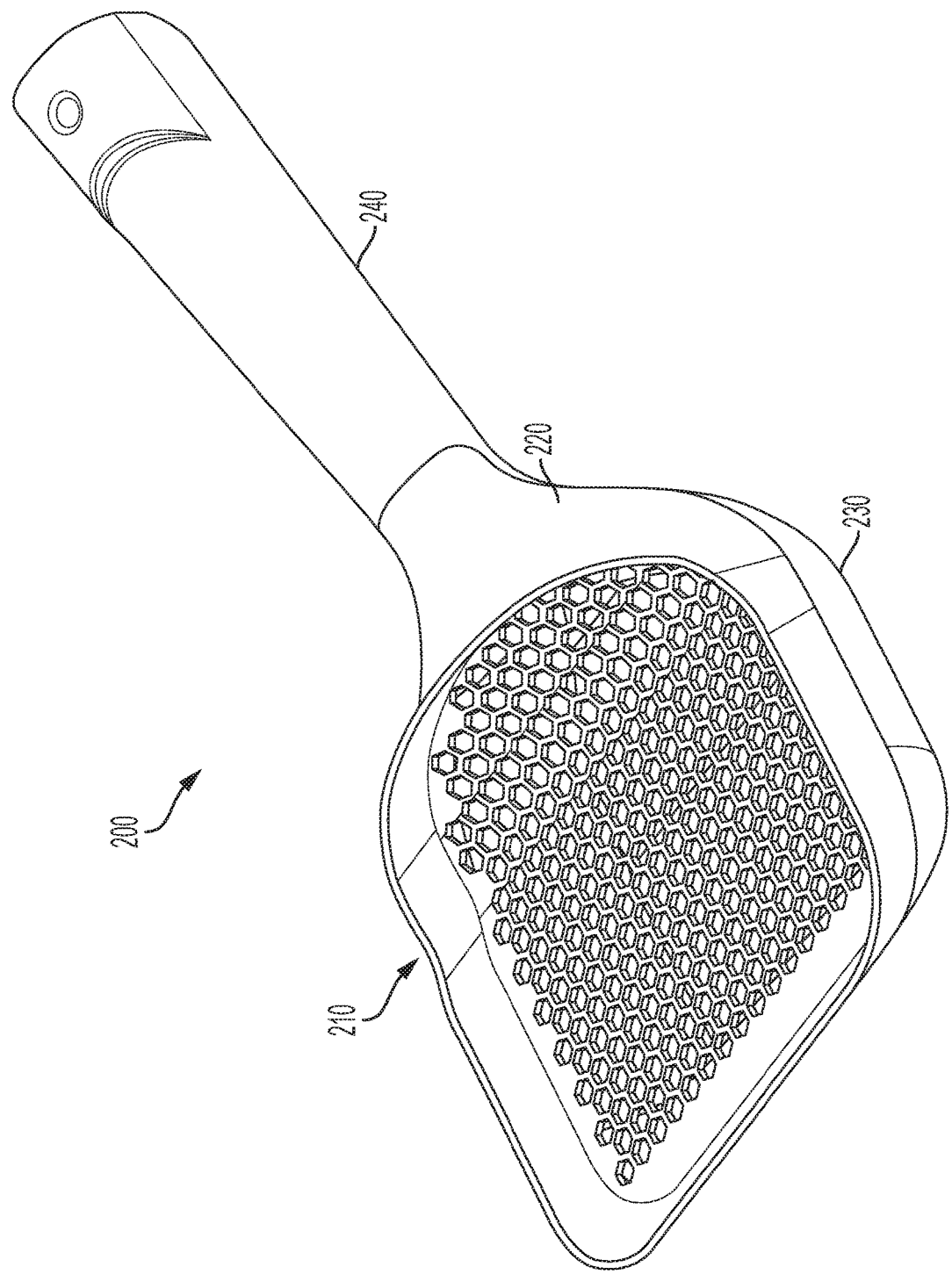
FIG. 14 depicts a top perspective view of a litter scoop in according with a still further embodiment of the disclosed subject matter.
Figure 15:
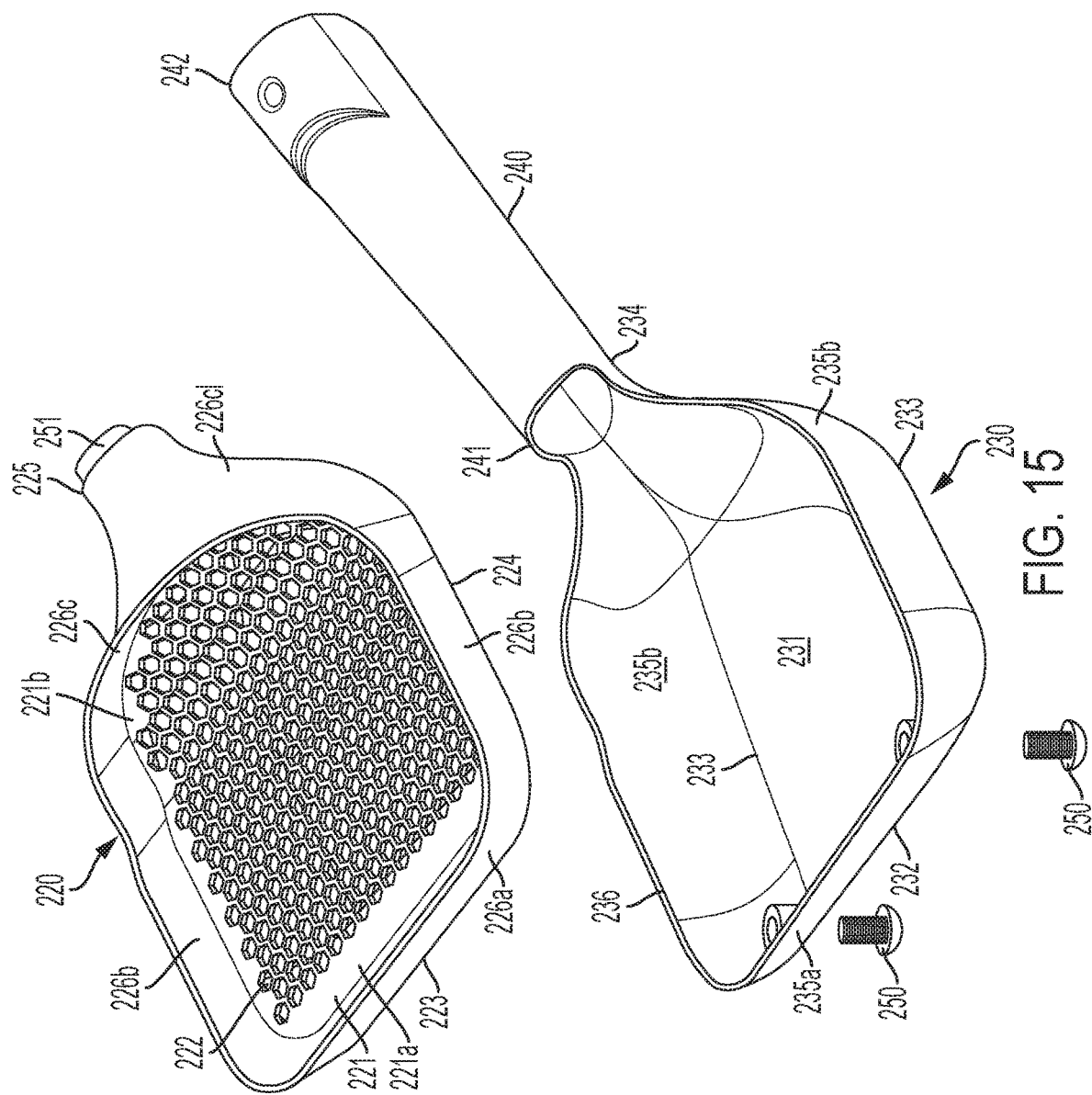
FIG. 15 depicts a perspective exploded view of the litter scoop of FIG. 14.

FIG. 13 depicts a bottom view of the litter scoop of FIGS. 9-12. A bottom side 1821 of the bottom scoop portion 1820 includes a main bottom section (or floor) 1822 that is substantially flat and has six side edges. The leading front side edge 1822a defines a front end section of the bottom scoop portion 1820 and opposite ends of the front side edge 1822a connect to front ends of a front right side edge 1822f and a front left side edge 1822b, which are substantially parallel to each other and extend rearwardly and substantially perpendicularly away from the front side edge 1822a.

Back ends of the front right side edge 1822f and the front left side edge 1822b connect to front ends of a back right side edge 1822e and a back left side edge 1822c, which extend rearwardly and inwardly away from the front side edge 1822a and toward a back side edge 1822d. Opposite ends of the back side edge 1822d connect to back ends of a back right side edge 1822e and a back left side edge 1822c, and the back side edge 1822d is substantially parallel to the front side edge 1822a.

As also shown in FIG. 13 and in FIGS. 9 and 11, a wall extends upward from the side edges and back edge 1822c-f of the floor 1822, and includes a right front sidewall 1823, a left front sidewall 1824, a right back sidewall 1825, a left back sidewall 1826, a bottom back sidewall 1827, and a top back sidewall 1828. The front right side edge 1822f connects along its entire length to a bottom front edge of a right front sidewall 1823 and the front left side edge 1822b connects along its entire length to a bottom front edge of a left front sidewall 1824. Both the right front sidewall 1823 and the left front sidewall 1824 extend substantially perpendicularly and upwardly away from a top surface of the main bottom section 1822 and rearwardly away from the front side edge 1822a. A top edge of a right back sidewall 1825 connects to a bottom back edge of the right front sidewall 1823 and a top edge of a left back sidewall 1826 (see, FIG. 9) connects to a bottom back edge of the left front sidewall 1824. A bottom edge of the right back sidewall 1825 connects to the back right side edge 1822e, a bottom edge of the left back sidewall 1826 connects to the back left side edge 1822c and the right back sidewall 1825 and the left back sidewall 1826 extend upwardly and outwardly from the top surface of the main bottom section 1822. A bottom edge of a bottom back sidewall 1827 connects to the back side edge 1822d and opposite side edges of the bottom back sidewall 1827 connect to back side edges of the right back sidewall 1825 and the left back sidewall 1826.

As seen in FIG. 11, a top back sidewall 1828 is connected along a bottom edge to the top edges of the right back sidewall 1825, the left back sidewall 1826 and the bottom back sidewall 1827. Thumb press hinge element 1830 is rotatably attached in about a middle of the top back sidewall 1828. Top edges of the right front sidewall 1823, the left front sidewall 1824, and the top back sidewall 1828 all end in the same plane to form a substantially flat surrounding top edge of the bottom scoop portion 1820. This substantially flat surrounding top edge of the bottom scoop portion 1820 fits tightly against the bottom surrounding edge 1818 of the top scoop portion 1810.

Returning to FIG. 9, the handle 1840 can have an ergonomically contoured smooth surface around most of its surfaces with the exception of a bottom surface 1845 of the handle 1840, which can be a substantially flat surface (see FIG. 13).

A further embodiment of a pet litter scoop according to the present disclosure will now be described with reference to FIGS. 14-21. A pet litter scoop 200 for separating unused litter pellets from used litter includes a scoop portion 210 comprising a sieved top scoop portion 220 and a solid bottom scoop portion 230 spaced apart from the top scoop portion 220, and a hollow tubular handle 240 disposed at a back end of the scoop portion 210. The handle 240 is in fluid communication with the bottom scoop portion 230.

The disclosed scoop 200 can comprise materials well-known to those of skill in the art; for example, but not limited to, plastic, metal, resins, composites, etc. It can be made using well-known methods; for example, but not limited to, injection molding, extrusion molding, thermoforming, compression molding, 3D printing, computer numerical control (CNC), cutting and assembly via welding, adhesives and/or fasteners.

Referring now to FIGS. 15-18, the bottom scoop portion 230 comprises a floor 231 having a leading edge 232 proximal to the front end of the scoop portion 220, a pair of opposing side edges 233, a back edge 234 proximal to the back end of the scoop portion 210 and in fluid communication with the handle 240, and a wall including a front portion 235a and side portions 235b extending upward from the leading edge 232 and side edges 233 respectively.

The top scoop portion 220 comprises a central section 221 having openings 222, such as a plurality of substantially hexagonal-shaped openings, sized such that the unused litter pellets cannot pass through the openings and the used litter passes through the openings. In further embodiments, openings 222 have a shape other than hexagonal, such as circular, oval, rectangular, triangular, etc. The top scoop portion 220 also has a leading edge 223 proximal to the front end of the scoop portion 210, a pair of opposing side edges 224, and a back edge 225 proximal to the back end of the scoop portion 210. The wall 235a-b of the bottom scoop portion is shaped such that the leading edge 223 and side edges 224 of the top scoop portion are engageable with an upper edge of the wall 235a-b, such that the floor 231 of the bottom scoop portion 230 and the central section 221 of the top scoop portion 220 are spaced from each other by at least the distance D, as shown in the cross-sectional view of FIG. 19.

In the illustrated embodiment, the top scoop portion 220 further includes a wall 226a-c including a front wall portion 226a, side wall portions 226b, and a rear wall portion 226c extending upward from the leading edge 223, the side edges 224, and the back edge 225, respectively, of the top scoop portion 220. The wall 226a-c facilitates retention of the used and unused litter scooped into the top scoop portion 220. The central section 221 of the top scoop portion 220 comprises a front portion 221a and a back portion 221b proximal to the back edge 225 of the top scoop portion 220, and the back portion 221b angles upwardly and away from the front portion 221a. The top scoop portion 220 and the bottom scoop portion 230 are separate from each other and connectible to each other, as by a pair of screws 250 and a tab 251 that engages the handle 240, or any other suitable well-known arrangement of fasteners.

Figure 16:
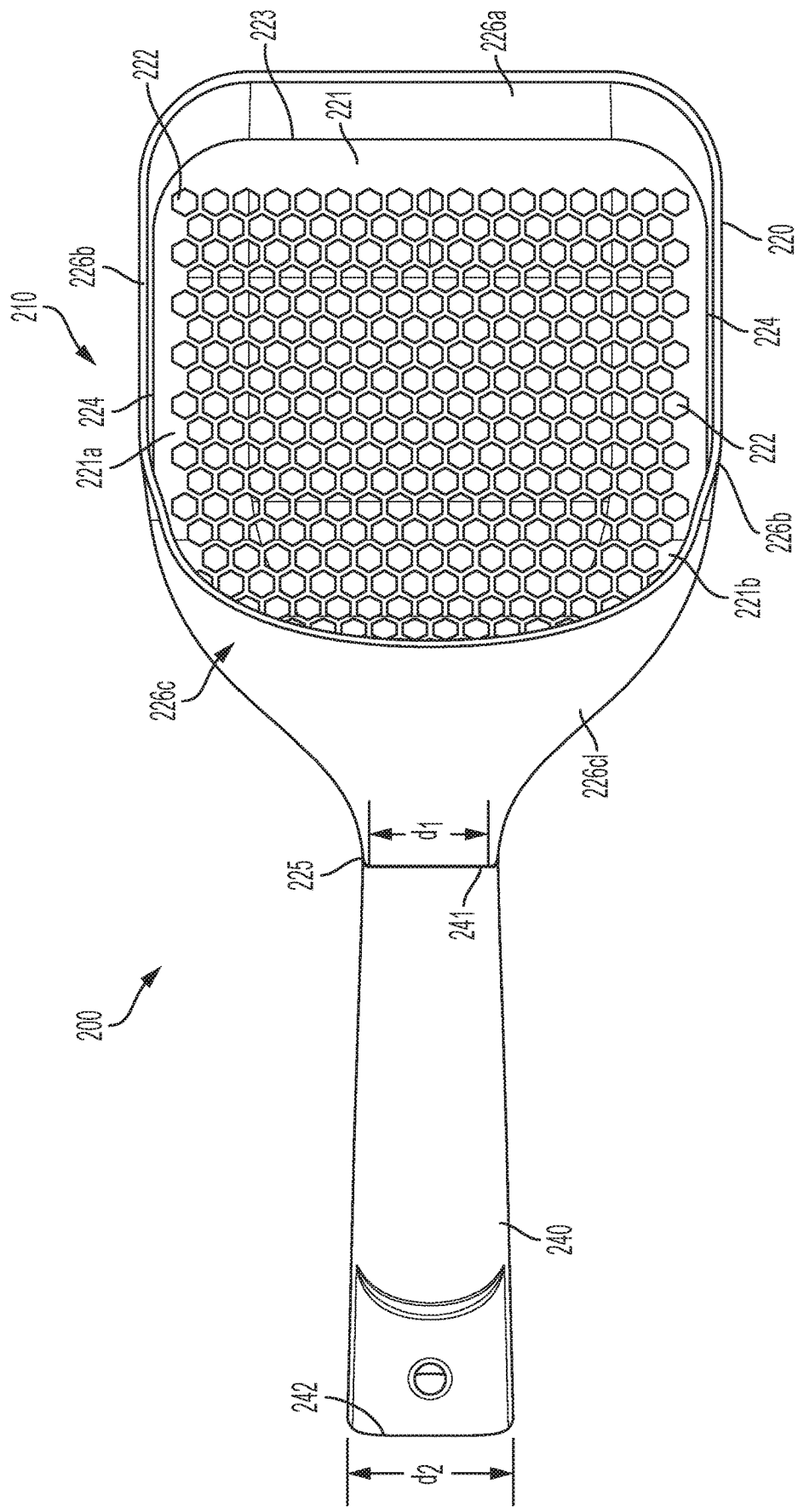
FIG. 16 depicts a top view of the litter scoop of FIG. 14.
Figure 17:
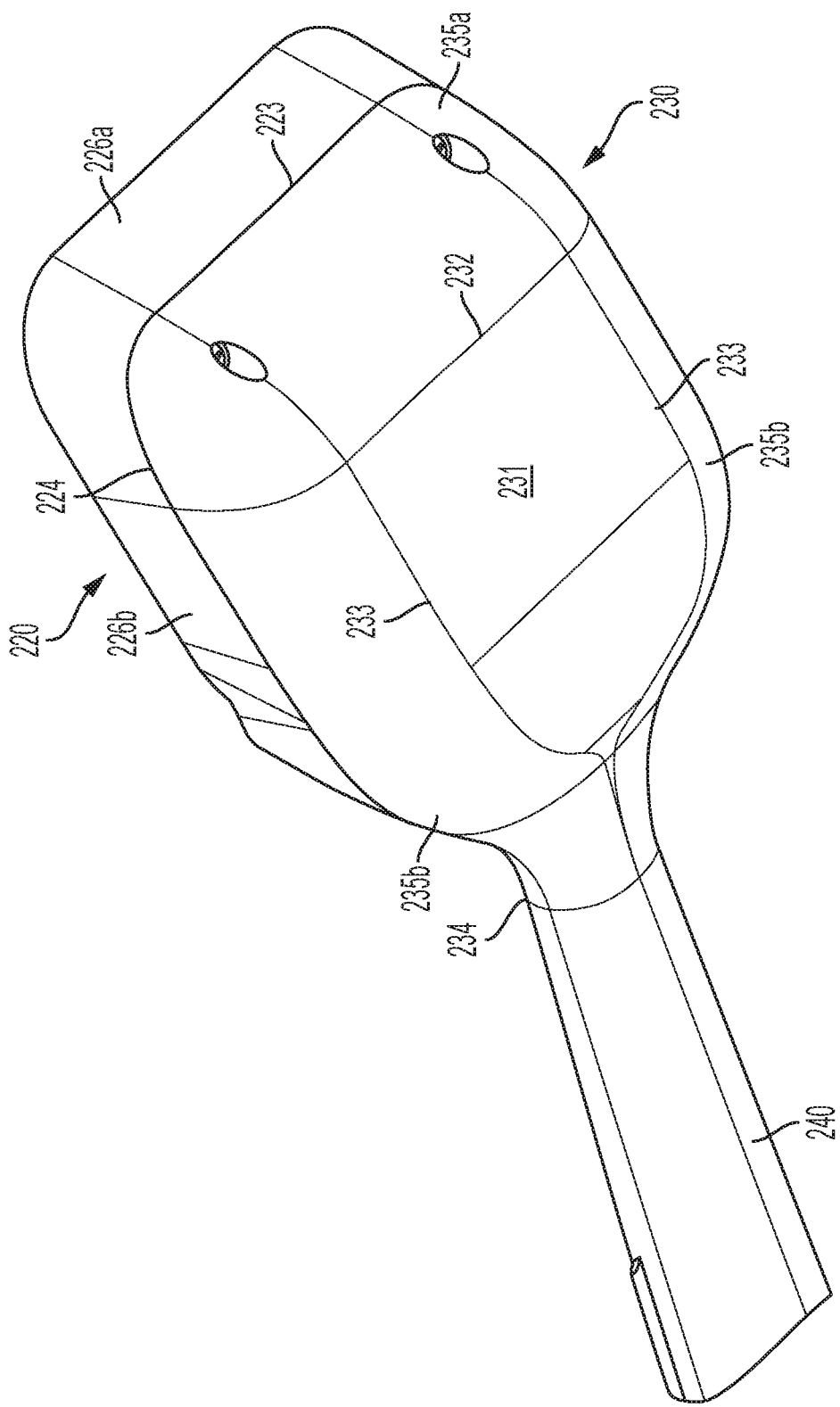
FIG. 17 depicts a bottom perspective view of the litter scoop of FIG. 14.
Figure 19:
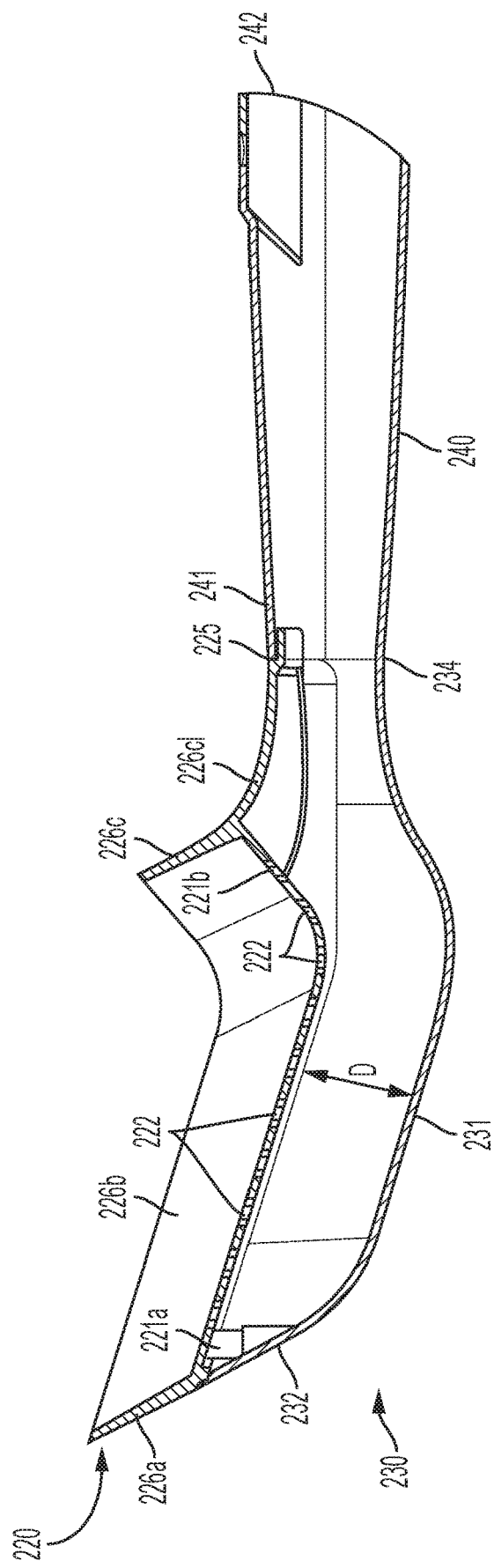
FIG. 19 depicts a side cross-sectional view of the litter scoop of FIG. 14.

The handle 240 is attached to the bottom scoop portion 230 in a conventional manner; for example, by being molded together as one piece, or assembled together. As shown in FIGS. 16 and 19, in certain embodiments the rear wall portion 226c of top scoop portion 220 includes a bridge portion 226c1 that is shaped complementary to the bottom scoop portion 230 and the handle 240, such that when the top and bottom scoop portions are assembled together, the transitional area between the bottom scoop portion 230 and the handle 240 is enclosed. Thus, the used litter is more easily removed without spillage, while the appearance of the scoop is improved.

As shown in FIG. 16, the hollow handle 240 has a first end 241 adjacent the bottom scoop portion 230 with a first diameter $d_1$ and a second end 242 remote from the scoop portion 210, the second end 242 having a second diameter $d_2$ that is larger than the first diameter $d_1$. The handle 240 thus tapers outward from the scoop portion 210 rearward. The handle 240 can have an ergonomically contoured smooth surface around some or all of its surfaces. The second end 242 of the handle 240 is open to allow the used litter powder to flow from the floor 221 of the bottom scoop portion 220 and through the handle 240 to be removed from the scoop 200.

Figure 18:
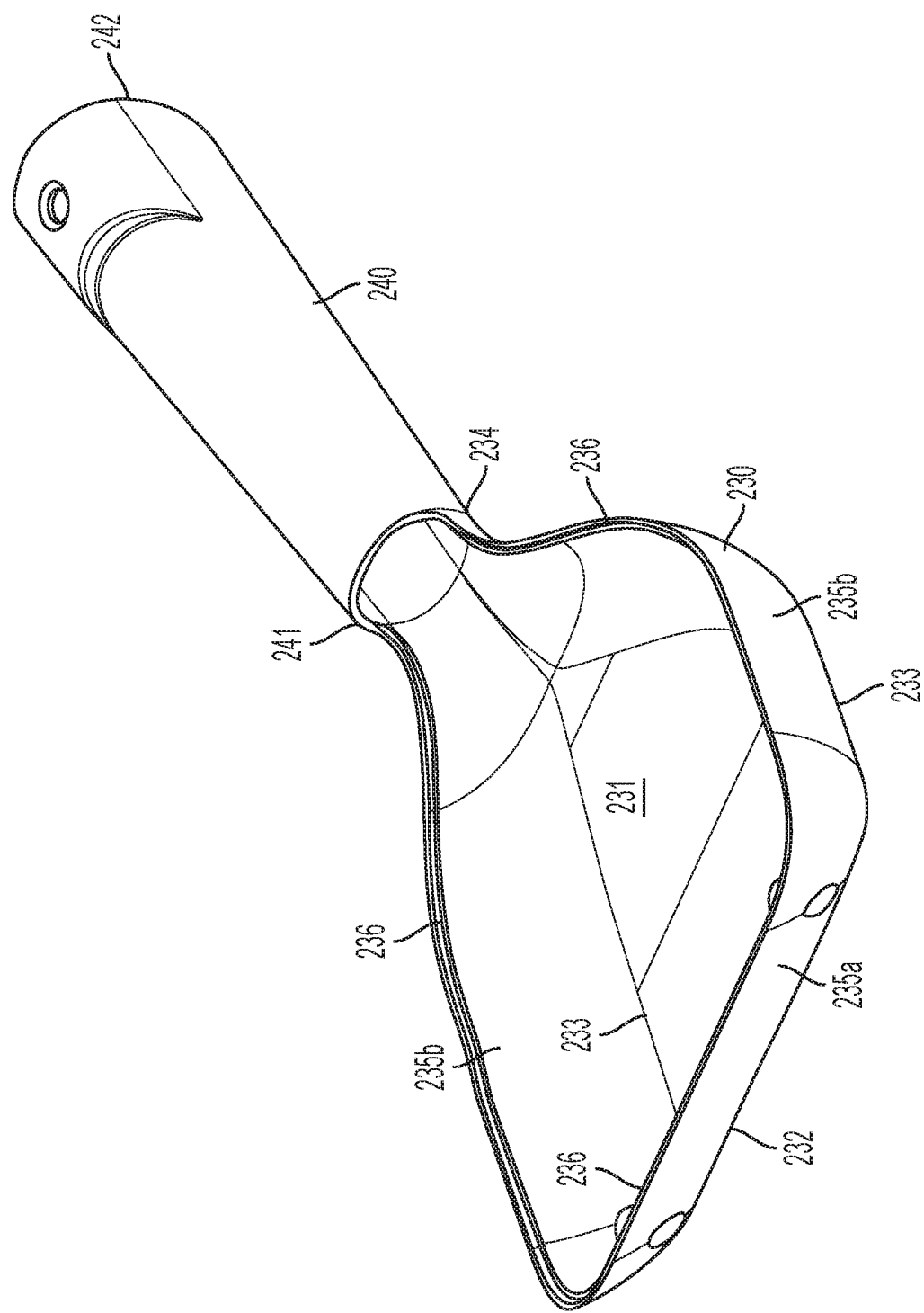
FIG. 18 depicts a partial top perspective view of the litter scoop of FIG. 14.
Figure 20:
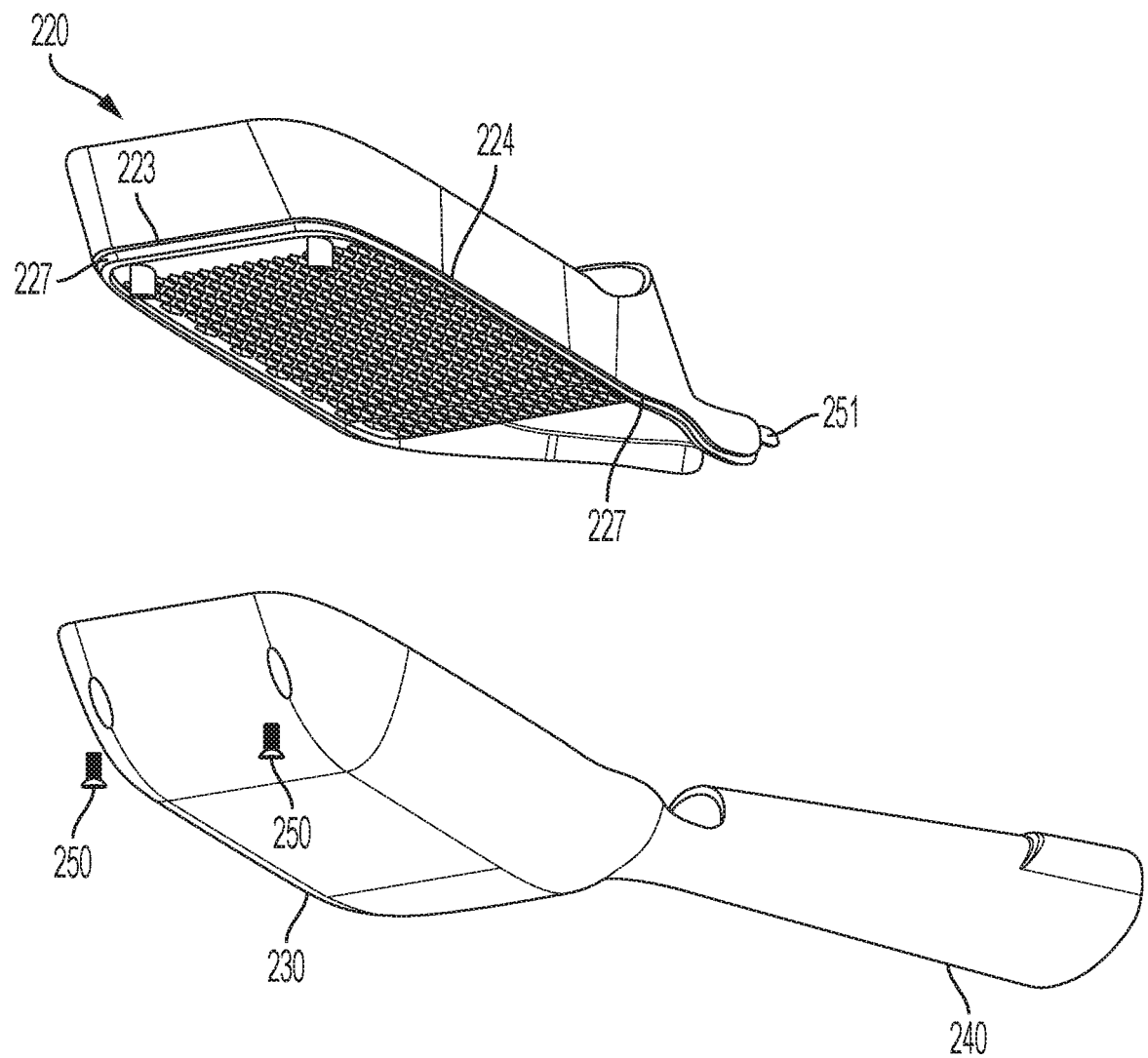
FIG. 20 depicts a perspective exploded view of the litter scoop of FIG. 14.
Figure 21:
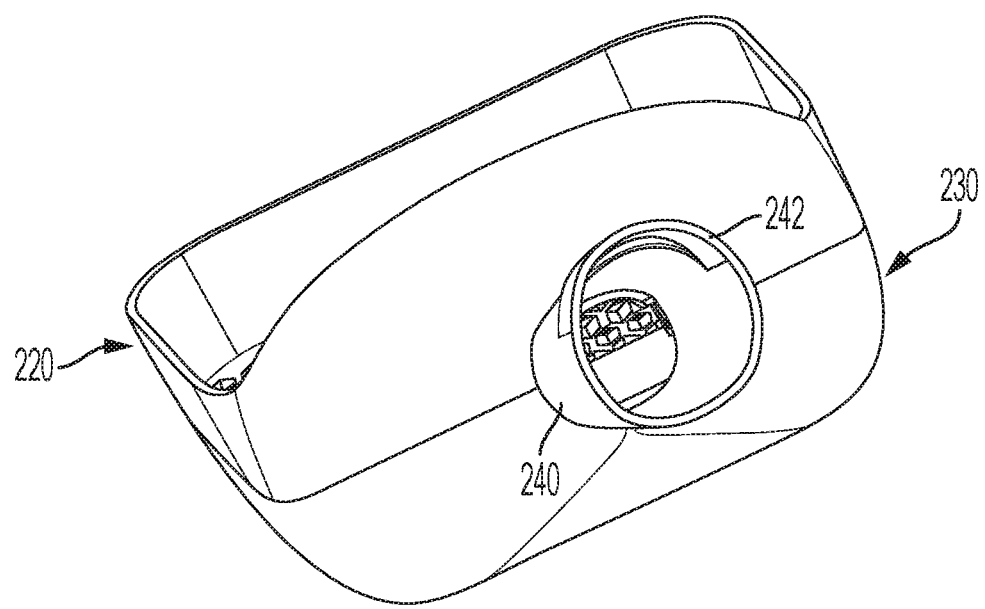
FIG. 21 depicts a rear perspective view of the litter scoop of FIG. 14.

As best seen in FIGS. 18 and 20, in this embodiment the wall 235a-b of the bottom scoop portion 230 has a first notched lip 236, and the leading edge 223 and side edges 224 of the top scoop portion 220 have a reciprocally-shaped second notched lip 227 engageable with the first notched lip 236. The first and second notched lips 236, 227 form a joint between the bottom and top scoop portions 230, 220 that prevents the used litter from escaping through the joint.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A pet litter scoop for separating unused litter pellets from used litter, the litter scoop comprising:
    a scoop portion having opposing front and back ends, the scoop portion comprising a sieved top scoop portion and a solid bottom scoop portion; and
    a hollow tubular handle disposed at the back end of the scoop portion and in fluid communication with the bottom scoop portion;
    wherein the bottom scoop portion comprises a floor having a leading edge proximal to the front end of the scoop portion, a pair of opposing side edges, a back edge proximal to the back end of the scoop portion and in fluid communication with the handle, and a wall extending upward from the side edges and leading edge;
    wherein the top scoop portion comprises a central section having openings sized such that the unused litter pellets cannot pass through the openings and the used litter passes through the openings, a leading edge proximal to the front end of the scoop portion, a pair of opposing side edges, and a back edge proximal to the back end of the scoop portion;
    wherein the wall of the bottom scoop portion is shaped such that the leading edge and side edges of the top scoop portion are engageable with an upper edge of the wall such that the floor of the bottom scoop portion and the central section of the top scoop portion are spaced from each other.

2. The pet litter scoop of claim 1, wherein the top scoop portion further includes a wall extending upward from the side edges and the back edge of the top scoop portion.

3. The pet litter scoop of claim 2, wherein the wall of the top scoop portion also extends upward from the leading edge of the top scoop portion.

4. The pet litter scoop of claim 3, wherein the central section of the top scoop portion comprises a front portion and a back portion proximal to the back edge of the top scoop portion, wherein the back portion angles upwardly and away from the front portion.

5. The pet litter scoop of claim 2, wherein the wall extending upward from the back edge of the top scoop portion includes a bridge portion that is shaped complementary to the bottom scoop portion and the handle, such that when the top and bottom scoop portions are assembled together, a transitional area between the bottom scoop portion and the handle is enclosed.

6. The pet litter scoop of claim 1, wherein the openings include a plurality of substantially hexagonal-shaped openings.

7. The pet litter scoop of claim 1, wherein the top scoop portion and the bottom scoop portion are separate from each other and connectible to each other.

8. The pet litter scoop of claim 7, wherein the handle is attached to the bottom scoop portion.

9. The pet litter scoop of claim 7, wherein the wall of the bottom scoop portion has a first notched lip, and the leading edge and side edges of the top scoop portion have a reciprocally-shaped second notched lip engageable with the first notched lip to form a joint between the bottom and top scoop portions that prevents the used litter from escaping through the joint.

10. The pet litter scoop of claim 1, wherein the handle has a first end adjacent the bottom scoop portion with a first diameter and a second end remote from the scoop portion, the second end having a second diameter larger than the first diameter.

11. The pet litter scoop of claim 1, wherein the handle has a first end adjacent the bottom scoop portion and a second end remote from the scoop portion;
    wherein the second end of the handle is open such that the used litter flows from the floor of the bottom scoop portion and through the handle for removal from the scoop.

12. A pet litter scoop for separating unused litter pellets from used litter, the litter scoop comprising:
    a two-piece scoop portion having opposing front and back ends, the scoop portion comprising a sieved top scoop portion and a solid bottom scoop portion, the top and bottom scoop portions being pivotably connected to each other at the back end of the scoop portion; and
    a handle disposed at the back end of the scoop portion;
    wherein the bottom scoop portion comprises a floor, the floor having a leading edge proximal to the front end of the scoop portion, a pair of opposing side edges, and a back edge proximal to the back end of the scoop portion, the bottom scoop portion further comprising a wall extending upward from the side edges and back edge of the floor;
    wherein the top scoop portion comprises a central section having openings sized such that the unused litter pellets cannot pass through the openings and the used litter passes through the openings, a leading edge proximal to the front end of the scoop portion, a pair of opposing side edges, and a back edge proximal to the back end of the scoop portion;
    wherein the top scoop portion further includes a wall extending upward from the side edges and the back edge of the top scoop portion;
    wherein the wall of the bottom scoop portion is engageable with the side and back edges of the top scoop portion, and is shaped such that the leading edge of the top scoop portion is engaged with the leading edge of the bottom scoop portion when the wall of the bottom scoop portion is engaged with the side and back edges of the top scoop portion;
    wherein the top and bottom scoop portions are pivotally movable relative to each other from a first position where the leading edge of the top scoop portion is engaged with the leading edge of the bottom scoop portion and the wall of the bottom scoop portion is engaged with the side and back edges of the top scoop portion, to a second position where the leading edge and side edges of the top scoop portion are spaced from the leading edge and the wall of the bottom scoop portion; and wherein the wall of the bottom scoop portion is further shaped such that the floor of the bottom scoop portion and the central section of the top scoop portion are spaced from each other when the top and bottom scoop portions are in the first position.

13. The pet litter scoop of claim 12, wherein the top scoop portion and the bottom scoop portion are connected to each other at their respective back edges by a hinge.

14. The pet litter scoop of claim 13, wherein the handle extends from the back edge of the bottom scoop portion, and the hinge is for moving the top scoop portion, relative to the bottom scoop portion and the handle, from the first position to the second position.

15. The pet litter scoop of claim 14, wherein the top scoop portion comprises a thumb press for moving the top scoop portion from the first position to the second position when a user is holding the handle.

16. The pet litter scoop of claim 12, wherein the scoop is for scooping the unused litter pellets and used litter when the top and bottom scoop portions are in the first position, and for removing the used litter that has passed through the openings from the bottom scoop portion when the top and bottom scoop portions are in the second position.

17. The pet litter scoop of claim 12, wherein when the top and bottom scoop portions are in the first position, an extreme front end of the leading edge of the top scoop portion engages an extreme front end of the leading edge of the bottom scoop portion.

18. The pet litter scoop of claim 12, wherein when the top and bottom scoop portions are in the first position, an extreme front end of the leading edge of the top scoop portion is disposed in front of an extreme front end of the leading edge of the bottom scoop portion.

19. The pet litter scoop of claim 12, wherein the top scoop portion includes a back wall extending upward from the back edge of the top scoop portion, and a thumb press connected to the back wall, wherein the thumb press is rotatably connected to the bottom scoop portion and the handle.

\* \* \* \* \*